(12) United States Patent
Kamada

(10) Patent No.: US 9,379,967 B2
(45) Date of Patent: Jun. 28, 2016

(54) COMMUNICATION SYSTEM AND COMMUNICATION CONTROL METHOD

(71) Applicant: NEC Corporation, Tokyo (JP)

(72) Inventor: Shinya Kamada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 70 days.

(21) Appl. No.: 14/396,063

(22) PCT Filed: Apr. 15, 2013

(86) PCT No.: PCT/JP2013/002536
§ 371 (c)(1),
(2) Date: Oct. 22, 2014

(87) PCT Pub. No.: WO2013/161213
PCT Pub. Date: Oct. 31, 2013

(65) Prior Publication Data
US 2015/0110106 A1 Apr. 23, 2015

(30) Foreign Application Priority Data
Apr. 27, 2012 (JP) ................................. 2012-102965

(51) Int. Cl.
*H04L 12/721* (2013.01)
*H04L 12/725* (2013.01)
*H04L 12/46* (2006.01)

(52) U.S. Cl.
CPC .............. *H04L 45/12* (2013.01); *H04L 45/302* (2013.01); *H04L 12/4641* (2013.01)

(58) Field of Classification Search
CPC .... H04L 12/4641; H04L 45/12; H04L 45/302
USPC ........................................................ 370/389
See application file for complete search history.

(56) References Cited

U.S. PATENT DOCUMENTS

| 7,154,851 B1 | 12/2006 | Fedyk et al. |
| 8,160,096 B1 * | 4/2012 | Anburaj ................ H04J 3/1605 370/255 |

(Continued)

FOREIGN PATENT DOCUMENTS

| JP | 08-149140 | 6/1996 |
| JP | 10-145424 | 5/1998 |

(Continued)

OTHER PUBLICATIONS

International Search Report PCT/JP2013/002536 dated Jul. 16, 2013.

(Continued)

*Primary Examiner* — Chi H Pham
*Assistant Examiner* — Robert Lopata
(74) *Attorney, Agent, or Firm* — Young & Thompson

(57) ABSTRACT

A communication system 100 has a communication path configured by connecting a starting-point device to an end-point device so as to be capable of communicating via at least one relay-point device. The communication system 1000 includes: a communication path determined band acquiring part 1001 that, for each of sections between communication devices adjacent to each other in the communication path, acquires a section available band, and acquires the smallest value between the section available band and a communication path request band that is a communication band requested for the communication path, as a communication path determined band; a band reserving part 1002 that reserves the acquired communication path determined band in the communication path; and a communication traffic controller 1003 that transmits communication traffic satisfying a traffic flow condition so that the communication traffic passes through the communication path where the communication path is reserved.

20 Claims, 16 Drawing Sheets

(56) References Cited

U.S. PATENT DOCUMENTS

| | | | |
|---|---|---|---|
| 8,787,154 B1* | 7/2014 | Medved | H04L 45/64 370/225 |
| 2001/0030945 A1* | 10/2001 | Soga | H04L 45/00 370/238 |
| 2003/0161338 A1* | 8/2003 | Ng | H04L 45/123 370/437 |
| 2005/0213504 A1* | 9/2005 | Enomoto | H04L 41/142 370/235 |
| 2006/0274650 A1* | 12/2006 | Tyagi | H04L 12/5695 370/229 |
| 2007/0104215 A1 | 5/2007 | Wang et al. | |
| 2007/0230362 A1* | 10/2007 | Bardalai | H04L 12/5695 370/252 |
| 2008/0240026 A1 | 10/2008 | Shih et al. | |
| 2009/0100459 A1* | 4/2009 | Riedl | H04N 21/2385 725/35 |
| 2009/0109891 A1* | 4/2009 | Fonseca, Jr. | H04L 12/5695 370/315 |
| 2009/0135729 A1* | 5/2009 | Saffre | H04L 12/5695 370/252 |
| 2009/0147723 A1* | 6/2009 | Fang | H04L 45/302 370/315 |
| 2009/0217326 A1* | 8/2009 | Hasek | H04N 7/17336 725/87 |
| 2009/0219853 A1* | 9/2009 | Hart | H04B 7/155 370/315 |
| 2010/0165987 A1 | 7/2010 | Takeguchi et al. | |
| 2011/0225312 A1* | 9/2011 | Liu | H04L 12/18 709/231 |
| 2012/0008503 A1* | 1/2012 | Qiu | H04L 43/0882 370/238 |
| 2012/0069837 A1* | 3/2012 | Pearce | H04L 47/823 370/352 |
| 2013/0107712 A1* | 5/2013 | Allan | H04L 45/24 370/235 |
| 2014/0023088 A1* | 1/2014 | Polk | H04L 47/76 370/468 |
| 2014/0293778 A1* | 10/2014 | Fernandez-Palacios Gimenez | H04L 45/302 370/230 |

FOREIGN PATENT DOCUMENTS

| | | |
|---|---|---|
| JP | 2000-244524 | 9/2000 |
| JP | 2001-223744 | 8/2001 |
| JP | 2011-082858 | 4/2011 |

OTHER PUBLICATIONS

Extended European search report, dated Oct. 29, 2015; Application No. 13781100.6.

* cited by examiner

Fig.2

| FLOW NUMBER | COMMUNICATION PATH NUMBER |
|---|---|
| FL#1 | CP#1 |
| FL#2 | CP#1 |
| FL#3 | CP#2 |

Fig.3

| COMMUNICATION PATH NUMBER | COMMUNICATION PATH PRIORITY | COMMUNICATION PATH IDENTIFIER | TRANSMISSION DESTINATION DEVICE ID | TRANSMISSION DESTINATION LINE ID | RESERVED COMMUNICATION BAND |
|---|---|---|---|---|---|
| CP#1 | 1 | S-VLAN#1 | CD#4 | CL#1 | 0Mbps |
| CP#2 | 2 | S-VLAN#2 | CD#4 | CL#3 | 0Mbps |

Fig.4

| FLOW NUMBER | FLOW PRIORITY | TRAFFIC IDENTIFIER | FLOW REQUEST BAND | TRANSMISSION DESTINATION DEVICE ID |
|---|---|---|---|---|
| FL#1 | 1 | C-VLAN#1 | 10Mbps | CD#4 |
| FL#2 | 2 | C-VLAN#2 | 20Mbps | CD#4 |
| FL#3 | 3 | C-VLAN#3 | 40Mbps | CD#4 |

Fig.5

| COMMUNICATION PATH NUMBER | COMMUNICATION PATH PRIORITY | COMMUNICATION PATH IDENTIFIER | TRANSMISSION SOURCE LINE ID | TRANSMISSION DESTINATION LINE ID | RESERVED COMMUNICATION BAND |
|---|---|---|---|---|---|
| CP#1 | 1 | S-VLAN#1 | CL#1 | CL#2 | 0Mbps |

Fig.6

| COMMUNICATION PATH NUMBER | COMMUNICATION PATH PRIORITY | COMMUNICATION PATH IDENTIFIER | TRANSMISSION SOURCE LINE ID | TRANSMISSION DESTINATION LINE ID | RESERVED COMMUNICATION BAND |
|---|---|---|---|---|---|
| CP#2 | 2 | S-VLAN#2 | CL#3 | CL#4 | 0Mbps |

Fig.11

| FLOW NUMBER | COMMUNICATION PATH NUMBER |
|---|---|
| FL#1 | CP#1 |
| FL#2 | CP#1 |

Fig.12

| FLOW NUMBER | COMMUNICATION PATH NUMBER |
|---|---|
| FL#3 | CP#2 |

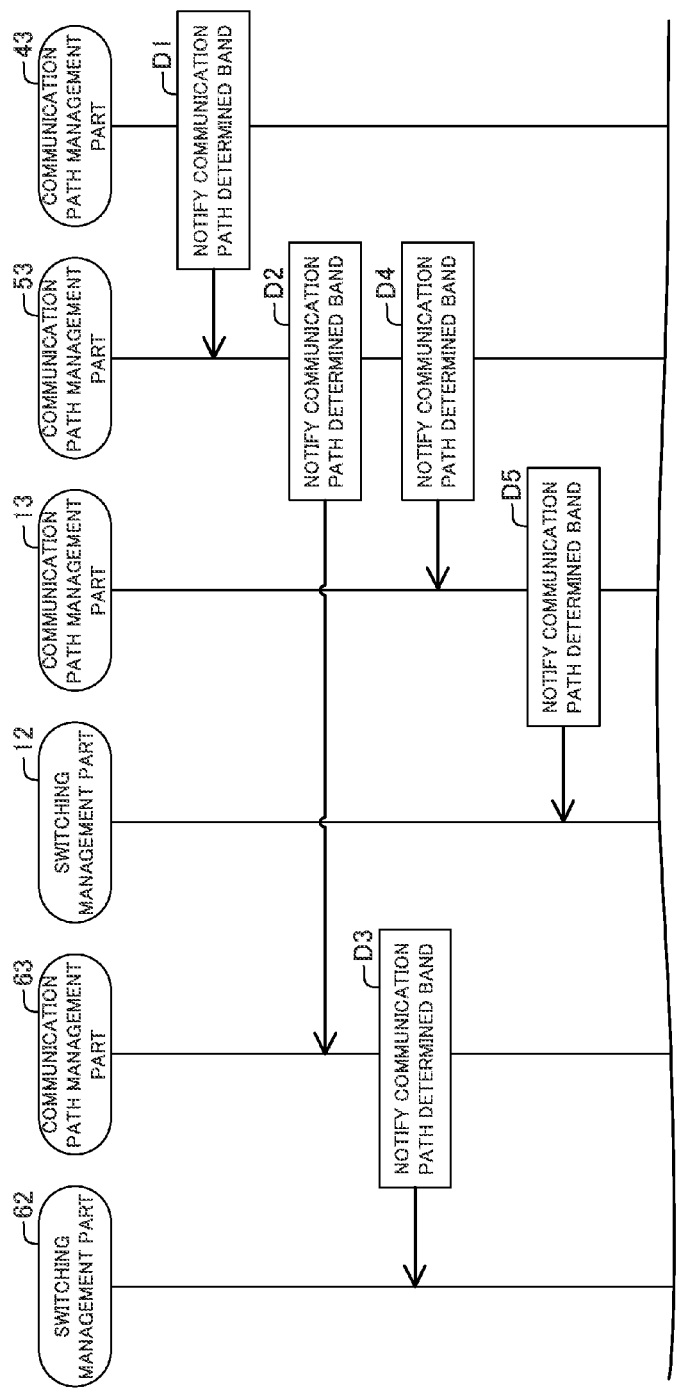

Fig.18

| FLOW NUMBER | FLOW PRIORITY | TRAFFIC IDENTIFIER | FLOW REQUEST BAND | TRANSMISSION DESTINATION DEVICE ID |
|---|---|---|---|---|
| FL#4 | 1 | C-VLAN#4 | 20Mbps | CD#4 |

Fig.19

| COMMUNICATION PATH NUMBER | COMMUNICATION PATH PRIORITY | COMMUNICATION PATH IDENTIFIER | TRANSMISSION DESTINATION DEVICE ID | TRANSMISSION DESTINATION LINE ID | RESERVED COMMUNICATION BAND |
|---|---|---|---|---|---|
| CP#3 | 1 | S-VLAN#3 | CD#4 | CL#5 | 0Mbps |

Fig.20

| COMMUNICATION PATH NUMBER | COMMUNICATION PATH PRIORITY | COMMUNICATION PATH IDENTIFIER | TRANSMISSION SOURCE LINE ID | TRANSMISSION DESTINATION LINE ID | RESERVED COMMUNICATION BAND |
|---|---|---|---|---|---|
| CP#1 | 2 | S-VLAN#1 | CL#1 | CL#2 | 10Mbps |
| CP#3 | 1 | S-VLAN#3 | CD#5 | CL#2 | 20Mbps |

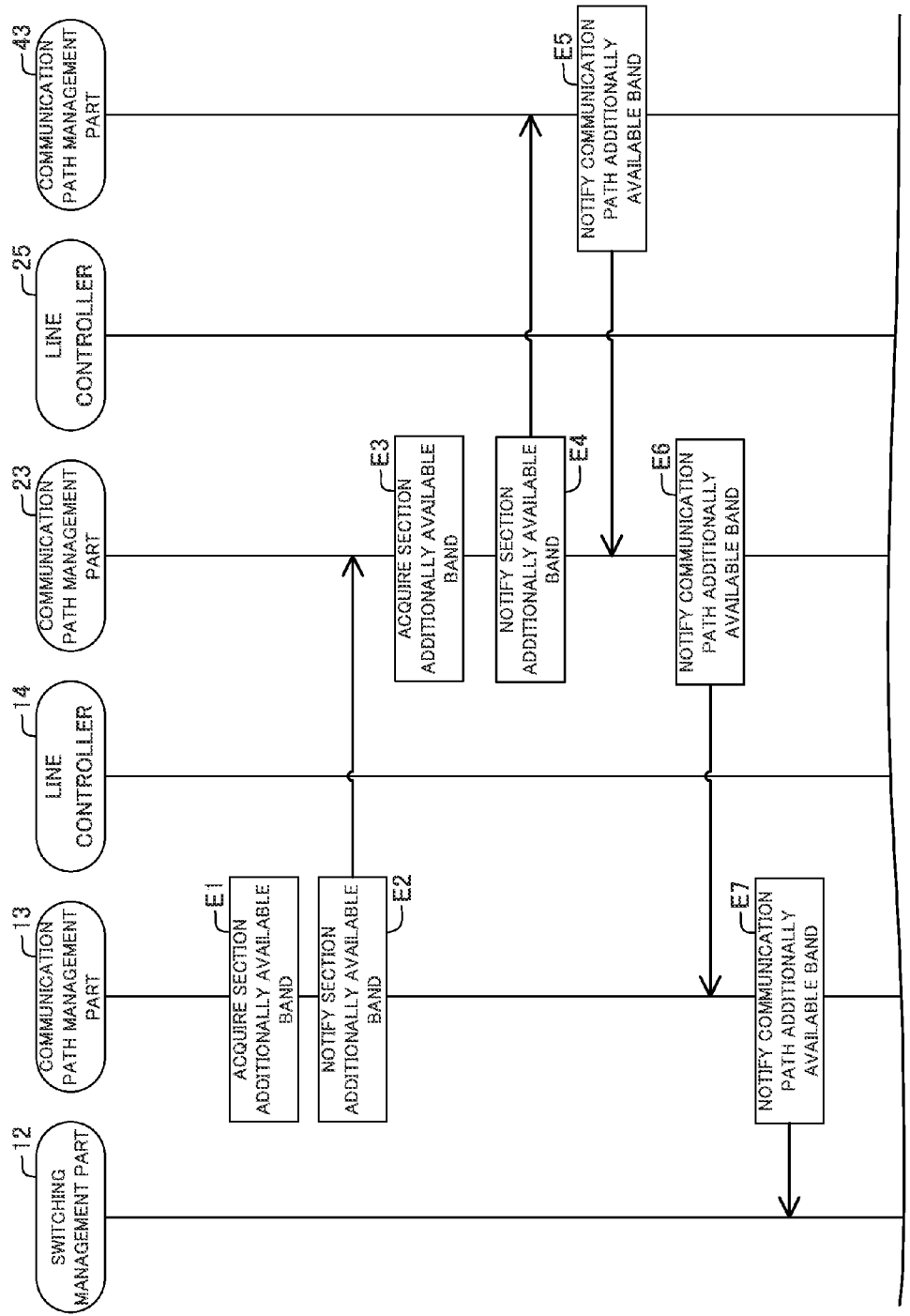

Fig.22

| COMMUNICATION PATH NUMBER | COMMUNICATION PATH PRIORITY | COMMUNICATION PATH IDENTIFIER | TRANSMISSION DESTINATION DEVICE ID | TRANSMISSION DESTINATION LINE ID | RESERVED COMMUNICATION BAND |
|---|---|---|---|---|---|
| CP#1 | 1 | S-VLAN#1 | CD#4 | CL#1 | 30Mbps |
| CP#2 | 2 | S-VLAN#2 | CD#4 | CL#3 | 40Mbps |

COMMUNICATION SYSTEM AND COMMUNICATION CONTROL METHOD

TECHNICAL FIELD

The present invention relates to a communication system including a plurality of communication devices.

BACKGROUND ART

A communication system including a plurality of communication devices is known. As one of this type of communication systems, a communication system disclosed in Patent Document 1 assigns a communication path to a traffic flow condition.

Herein, a communication path is configured by connection of a communication device serving as a starting-point device and a communication device serving as an end-point device in a state of being cable of communicating via at least one relay-point device. A relay-point device is a communication device other than a starting-point device and an end-point device. Moreover, a traffic flow condition contains a condition for determination of a communication device of the source of transmission and a communication device of the destination of transmission.

The communication system transmits communication traffic which satisfies a traffic flow condition so that the communication traffic passes through a communication path assigned to the traffic flow condition.

As provided in IEEE802.1AX of IEEE (the Institute of Electrical and Electronics Engineers, Inc.) standards, a technique of using a plurality of communication lines as one virtual communication line, namely, link aggregation is known.

Patent Document 1: Japanese Unexamined Patent Application Publication No. 2001-082858

With this technique, a section available band, which is a communication band available in a section between communication devices adjacent to each other in a communication path, often varies for each section. However, with the above-mentioned communication system, it is impossible to acquire a section available band of each section, and hence, it may be impossible to transmit communication traffic through an appropriate communication path.

SUMMARY

Accordingly an object of the present invention is to provide a communication system which can solve the abovementioned problem, "there is a case where it is impossible to transmit communication traffic through an appropriate communication path."

In order to achieve the object, a communication system as an aspect of the present invention is a system including a plurality of communication devices.

Moreover, the communication system has a communication path configured by connecting a starting-point device to an end-point device so as to be capable of communicating via at least one relay-point device, the starting-point device being one of the plurality of communication devices, the end-point device being one of the communication devices other than the starting-point device among the plurality of communication devices, and the relay-point device being a communication device other than the starting-point device and the end-point device among the plurality of communication devices, and the communication system includes:

a communication path determined band acquiring means for, for each of sections between communication devices adjacent to each other in the communication path, acquiring a section available band that is a communication band available in the section, and acquiring, as a communication path determined band, a smallest value between the acquired section available band and a communication path request band that is a communication band requested for the communication path;

a band reserving means for reserving a communication band in the communication path by reserving the acquired communication path determined band in each of the sections configuring the communication path; and a communication traffic controlling means for transmitting communication traffic so that the communication traffic passes through the communication path where the communication band is reserved, the communication traffic satisfying a traffic flow condition including a condition that a transmission source communication device is the starting-point device and a transmission destination communication device is the end-point device.

Further, a communication control method as another aspect of the present invention is a method applied to a communication system including a plurality of communication devices.

Moreover, the communication system has a communication path configured by connecting a starting-point device to an end-point device so as to be capable of communicating via at least one relay-point device, the starting-point device being one of the plurality of communication devices, the end-point device being one of the communication devices other than the starting-point device among the plurality of communication devices, and the relay-point device being a communication device other than the starting-point device and the end-point device among the plurality of communication devices.

Besides, the communication control method includes:

for each of sections between communication devices adjacent to each other in the communication path, acquiring a section available band that is a communication band available in the section, and acquiring, as a communication path determined band, a smallest value between the acquired section available band and a communication path request band that is a communication band requested for the communication path;

reserving a communication band in the communication path by reserving the acquired communication path determined band in each of the sections configuring the communication path; and transmitting communication traffic so that the communication traffic passes through the communication path where the communication band is reserved, the communication traffic satisfying a traffic flow condition including a condition that a transmission source communication device is the starting-point device and a transmission destination communication device is the end-point device.

With the configurations as described above, the present invention makes it possible to transmit communication traffic through an appropriate communication path.

BRIEF DESCRIPTION OF DRAWINGS

FIG. 2 is a table showing flow distribution information according to the first exemplary embodiment of the present invention;

FIG. 3 is a table showing communication path information according to the first exemplary embodiment of the present invention;

FIG. 4 is a table showing flow information according to the first exemplary embodiment of the present invention;

FIG. 5 is a table showing communication path information according to the first exemplary embodiment of the present invention;

FIG. 6 is a table showing communication path information according to the first exemplary embodiment of the present invention;

FIG. 11 is a table showing flow distribution information according to the first exemplary embodiment of the present invention;

FIG. 12 is a table showing flow distribution information according to the first exemplary embodiment of the present invention;

FIG. 16 is a sequence diagram showing the operation of the communication system according to the third exemplary embodiment of the present invention;

FIG. 17 is a table showing communication path information according to the third exemplary embodiment of the present invention;

FIG. 18 is a table showing flow information according to the third exemplary embodiment of the present invention;

FIG. 19 is a table showing communication path information according to the third exemplary embodiment of the present invention;

FIG. 20 is a table showing communication path information according to the third exemplary embodiment of the present invention;

FIG. 21 is a sequence diagram showing the operation of a communication system according to a fourth exemplary embodiment of the present invention;

FIG. 22 is a table showing communication path information according to the fourth exemplary embodiment of the present invention;

EXEMPLARY EMBODIMENTS

Below, the respective exemplary embodiments of a communication and a communication control method according to the present invention will be described, referring to FIGS. 1 to 25.

First Exemplary Embodiment

Configuration

Figure 1:
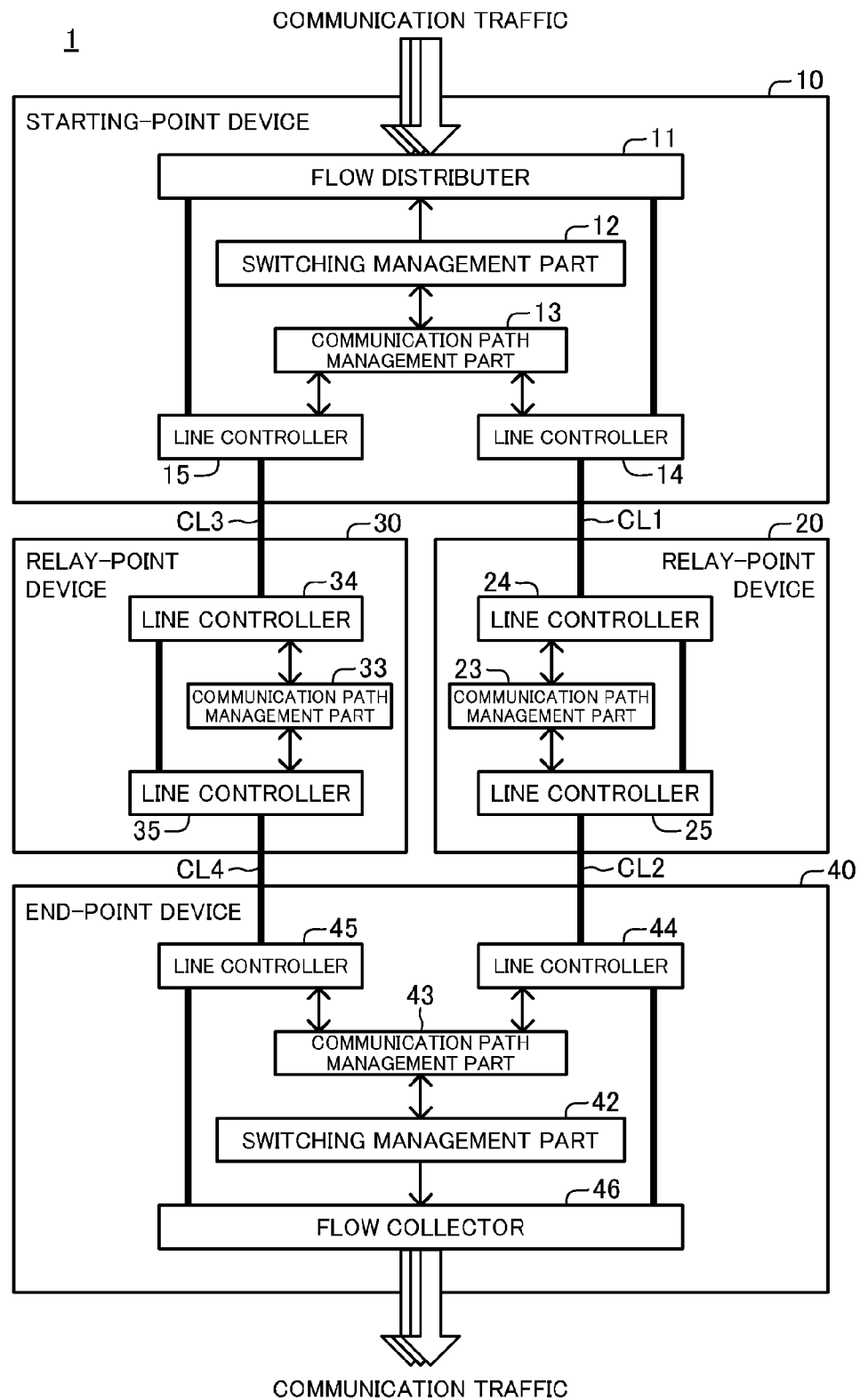
FIG. 1 is a diagram showing a schematic configuration of a communication system according to a first exemplary embodiment of the present invention.

As shown in FIG. 1, a communication system 1 according to a first exemplary embodiment includes a plurality of (in this exemplary embodiment, four) communication devices 10, 20, 30 and 40. Alternatively, the communication system 1 may include five or more communication devices.

The communication device 10 and the communication device 20 are connected so as to be capable of communicating with each other via a communication line CL1. Likewise, the communication device 20 and the communication device 40 are connected so as to be capable of communicating with each other via a communication line CL2.

Further, the communication device 10 and the communication device 30 are connected so as to be capable of communicating with each other via a communication line CL3. Likewise, the communication device 30 and the communication device 40 are connected so as to be capable of communicating with each other via a communication line CL4.

In this exemplary embodiment, the communication device 10 configures a starting-point device. The communication device 40 configures an end-point device. The communication device 20 and the communication device 30 each configure a relay-point device.

In the communication system 1, a first communication path is configured by connection of the starting-point device 10 and the end-point device 40 in a manner of being capable of communicating via the relay-point device 20. Likewise, in the communication system 1, a second communication path is configured by connection of the starting-point device 10 and the end-point device 40 in a manner of being capable of communicating via the relay-point device 30. In other words, in the communication system 1, a plurality of (in this exemplary embodiment, two) communication paths are configured.

The communication system 1 has a communication path assignment function of assigning a communication path to a traffic flow and a flow control function of controlling a traffic flow.

Herein, a traffic flow is a group of communication traffics which satisfies a predetermined traffic flow condition. Communication traffic is unit data having a predetermined format. In this exemplary embodiment, unit data is a packet. Alternatively, unit data may be a frame.

A traffic flow condition contains a condition that a communication device of the source of transmission is the starting-point device 10 and a communication device of the destination of transmission is the end-point device 40. In this exemplary embodiment, a traffic flow condition also contains a condition that a VLAN (Virtual Local Area Network) ID provided in IEEE802.1Q is a preset value.

Firstly, components for realizing the flow control function will be described.

The communication system 1 includes a flow distributer 11 and a flow collector 46 as major components for realizing the flow control function. To be specific, the starting-point device 10 includes the flow distributer 11. Meanwhile, the communication device 40 includes the flow collector 46.

The flow distributer 11 stores flow distribution information generated by the communication path assignment function. Flow distribution information is information in which a plurality of traffic flow conditions are associated with communication paths assigned to the respective traffic flow conditions.

In this exemplary embodiment, flow distribution information is a table in which flow identification information (in this exemplary embodiment, a flow number) for identifying a traffic flow corresponding to a traffic flow condition is associated with communication path identification information (in this exemplary embodiment, a communication path number) for identifying a communication path, as shown in FIG. 2.

The flow distributer 11 receives communication traffic from the outside of the communication system 1. The flow distributer 11 specifies a traffic flow condition satisfied by the received communication traffic. The flow distributer 11 specifies a communication path associated with the specified traffic flow condition, based on the flow distribution information.

The flow distributer 11 transmits the received communication traffic to the relay-point device 20 or 30 adjacent to the starting-point device 10 in the specified communication path so that the communication traffic passes through the communication path.

The flow collector 46 stores the same flow distribution information as the flow distribution information stored by the flow distributer 11. The flow collector 46 receives communication traffic from the relay-point devices 20 and 30. The flow collector 46 collects (aggregates) the received communication traffics based on the flow distribution information, and transmits the collected communication traffic to the outside of the communication system 1.

Next, components for realizing the communication path assignment function will be described.

The communication system 1 includes switching management parts 12 and 42, communication path management parts 13, 23, 33 and 43, and line controllers 14, 15, 25, 35, 44 and 45, as major components for realizing the communication path assignment function.

To be specific, the starting-point device 10 includes the switching management part 12, the communication path management part 13, and the line controllers 14 and 15. The relay-point device 20 includes the communication path management part 23, and the line controllers 24 and 25. The relay-point device 30 includes the communication path management part 33, and the line controllers 34 and 35. The end-point device 40 includes the switching management part 42, the communication path management part 43, and the line controllers 44 and 45.

The starting-point device 10 accepts communication path information and flow information, and stores the accepted communication path information and flow information. In this exemplary embodiment, communication path information and flow information are inputted by a manager of the communication system 1. Alternatively, communication path information and flow information may be information received from the outside of the communication system 1.

Communication path information is information in which a communication path, an end-point device configuring the communication path, and a communication path priority representing a rank are associated. In this exemplary embodiment, communication path information is a table in which communication path identification information (in this exemplary embodiment, a communication path number), a communication path priority, a communication path identifier, transmission destination device identification information (a transmission destination device ID), transmission destination line identification information (a transmission destination line ID), and a reserved communication band are associated, as shown in FIG. 3.

A communication path identifier is information given to communication traffic, and is information for identifying a communication path through which the communication traffic passes. In this exemplary embodiment, a communication path identifier is VLAN ID.

A transmission destination device ID is information for identifying a communication device of the destination of transmission in a communication path.

A transmission destination line ID is information for identifying the communication lines CL1 and CL3 connected with the starting-point device 10 in a direction of transmission of communication traffic in a communication path (a first direction).

A reserved communication band is information representing a communication band which is already reserved in a communication path. A reserved communication band is updated as described later when a new communication band is reserved in a communication path.

Flow information is information in which a traffic flow condition, a flow request band as a communication band necessary for transmission of communication traffic satisfying the traffic flow condition, and a flow priority representing a rank are associated. In this exemplary embodiment, flow information is a table in which flow identification information (in this exemplary embodiment, a flow number), a flow priority, a traffic identifier, a flow request band, and transmission destination device identification information (a transmission destination device ID) are associated, as shown in FIG. 4.

In this exemplary embodiment, a traffic identifier and a transmission destination device ID compose a traffic flow condition. In this exemplary embodiment, a traffic identifier is a VLAN ID. In other words, in this exemplary embodiment, among communication traffics, communication traffics which are provided with a traffic identifier and for which a communication device identified by a transmission destination device ID is set as a transmission destination compose a traffic flow identified by a flow number.

The relay-point device 20 accepts communication path information, and stores the accepted communication path information. In this exemplary embodiment, communication path information is inputted by a manager of the communication system 1. Alternatively, communication path information may be information received from the outside of the communication system 1.

In this exemplary embodiment, communication path information accepted by the relay-point device 20 is a table in which communication path identification information (in this exemplary embodiment, a communication path number), a communication path priority, a communication path identifier, transmission source line identification information (a transmission source line ID), transmission destination line identification information (a transmission destination line ID), and a reserved communication band are associated, as shown in FIG. 5.

Herein, a transmission source line ID is information for identifying a communication line (in this exemplary embodiment, the communication line CL1) connected to the relay-point device 20 in a direction (a second direction) opposite to the direction (the first direction) of transmission of communication traffic in a communication path.

Likewise, the relay-point device 30 accepts communication path information, and stores the accepted communication path information. In this exemplary embodiment, communication path information is inputted by a manager of the communication system 1. Alternatively, communication path information may be information received from the outside of the communication system 1.

In this exemplary embodiment, communication path information accepted by the relay-point device 30 is a table in which communication path identification information (in this exemplary embodiment, a communication path number), a communication path priority, a communication path identifier, transmission source line identification information (a transmission source line ID), transmission destination line identification information (a transmission destination line ID), and a reserved communication band are associated, as shown in FIG. 6.

The switching management part 12 acquires the sum of flow request bands for traffic flow conditions in which transmission destination communication devices are the same (in this exemplary embodiment, the end-point device 40) and communication paths are not assigned yet, based on the table shown in FIG. 4.

Further, the switching management part 12 extracts communication paths associated with the same end-point device (in this exemplary embodiment, the end-point device 40) as the transmission destination communication devices provided in the abovementioned traffic flow conditions, based on the table shown in FIG. 3.

Then, the switching management part 12 executes a band reservation process and a communication path assignment process on each of the extracted communication paths in order of rank represented by a communication path priority associated with the communication path in the table shown in FIG. 3.

The band reservation process is a process of acquiring a communication path determined band based on a communication path request band that is a communication band requested for a communication path, and reserving the acquired communication path determined band in the communication path. The details of the band reservation process will be described later.

The communication path assignment process is a process of assigning a communication path in which a communication band is reserved to a traffic flow condition. To be specific, the communication path assignment process is a process of assigning a communication path to a traffic flow condition in order of rank represented by a flow priority associated with the traffic flow condition in the table shown in FIG. 4.

In this communication path assignment process, in a case where there is a traffic flow condition which is associated with a flow request band equal to or less than a portion not assigned to any traffic condition yet of the communication band reserved in the communication path and to which a communication path is not assigned yet, the communication path is assigned to the traffic flow condition.

When assignment of communication paths to all of the traffic flow conditions is finished, the switching management part 12 stops executing the band reservation process and the communication path assignment process.

The switching management part 12 generates flow distribution information that is information in which traffic flow conditions are associated with communication paths assigned to the traffic flow conditions, respectively.

The switching management part 12 outputs the generated flow distribution information to the flow distributer 11. Moreover, the switching management part 12 transmits the generated flow distribution information to the end-point device 40 via any of the assigned communication paths.

Figure 7:
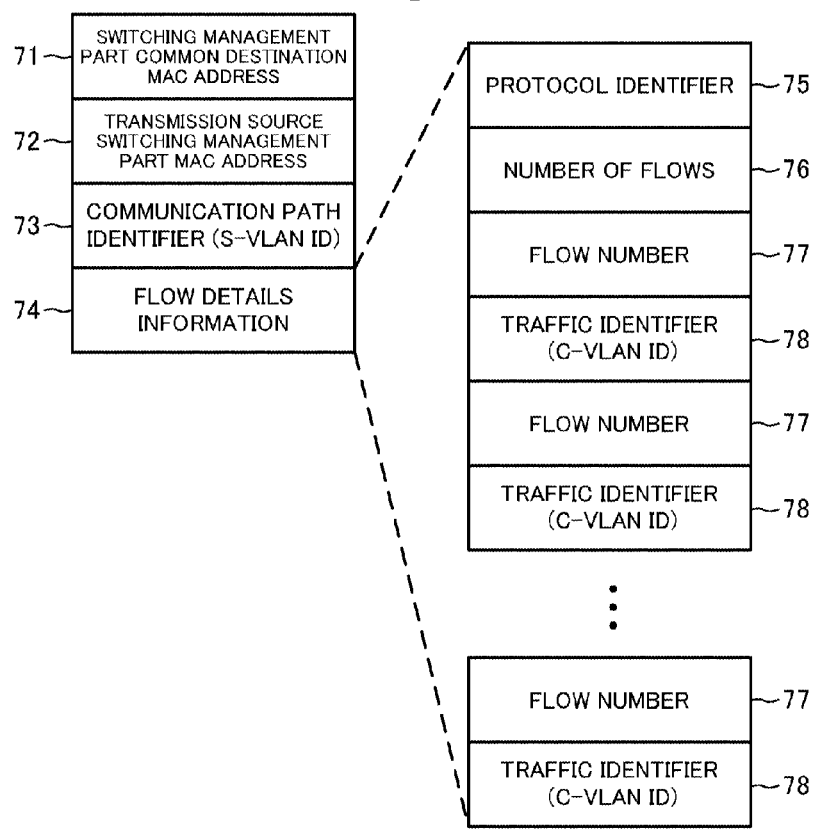
FIG. 7 is an explanatory diagram conceptually showing a distribution information packet according to the first exemplary embodiment of the present invention.

In this exemplary embodiment, the flow distribution information is transmitted in a state of being contained in a distribution information packet as shown in FIG. 7.

The distribution information packet contains a switching management part common destination MAC address 71, a transmission source switching management part MAC address 72, a communication path identifier 73, and flow details information 74.

The switching management part common destination MAC address 71 is a MAC address which is used in common (i.e., previously set) in the communication system 1 when the switching management part 12 transmits the distribution information packet to another switching management part in a communication path. For example, the switching management part common destination MAC address 71 is "01-19-A7-00-00-01."

The transmission source switching management part MAC address 72 is a MAC address which is assigned to a switching management part as the source of transmission of the distribution information packet.

The communication path identifier 73 is information for identifying a communication path, and is information given to communication traffic satisfying a traffic flow condition to which the communication path is assigned. In this exemplary embodiment, the communication path identifier 73 is an S-VLAN (Service VLAN) ID.

The flow details information 74 contains a protocol identifier 75 and a number-of-flows 76. Moreover, the flow details information 71 contains the number-of-flows 76 of pairs of flow numbers 77 and traffic identifiers 78.

The protocol identifier 75 is an identifier representing that the packet is a distribution information packet (i.e., a previously set identifier).

The number-of-flows 76 is the number of traffic flow conditions to which communication paths are assigned (i.e., the number of traffic flows).

Further, the flow number 77 is flow identification information for identifying a traffic flow corresponding to a traffic flow condition. The traffic identifier 78 is information for identifying a traffic flow corresponding to a traffic flow condition, and is information given to communication traffic composing the traffic flow. In this exemplary embodiment, the traffic identifier 78 is a C-VLAN (Customer VLAN) ID.

Herein, the details of the band reservation process will be described.

Firstly, the switching management part 12 acquires the sum of flow request bands corresponding to traffic flow conditions in which transmission destination communication devices are the same (in this exemplary embodiment, the end-point device 10) and to which communication paths are not assigned yet, based on the table shown in FIG. 4.

The switching management part 12 uses the acquired sum of the flow request bands as a communication path request band for a communication path on which the band reservation process is to be executed (a target communication path). To be specific, the switching management part 12 outputs the sum of the flow request bands as the communication path request band, and target communication path specification information for specifying the target communication path, to the communication path management part 13.

The communication path management part 13 specifies the communication lines CL1 and CL3 connected with the starting-point device 10 in the target communication path, based on the table shown in FIG. 3. The communication path management part 13 acquires line band information from the line controllers 14 and 15 with which the specified communication lines are connected, respectively. Line band information is information representing the maximum communication band that is available in a communication line.

The line controller 14 outputs line band information representing the maximum communication band that is available in the communication line CL1 connected with the line controller 14, to the communication path management part 13.

In this exemplary embodiment, the line controller 14 outputs line band information when accepting a request from the communication path management part 13. Meanwhile, the line controller 14 may be configured to output line band information in the event of change of the line band information. Alternatively, the line controller 14 may be configured to output line band information every time a preset output period passes. The timings of output of line band information by the line controllers other than the line controller 14 are set in the same manner as the timing of output by the line controller 14.

The line controller 15 outputs line band information representing the maximum communication band that is available in the communication line CL2 connected with the line controller 15, to the communication path management part 13.

The communication path management part 13 acquires the sum of communication bands that are already reserved in the target communication path (reserved, communication bands), based on the table shown in FIG. 3. Then, the communication path management part 13 acquires a value as a result of subtracting the sum of the reserved communication bands from a communication band represented by the acquired line band information, as a section available band that is an available communication band in the communication line (a section which configures the communication path).

Next, the communication path management part 13 acquires the smallest value between the communication path request band accepted from the switching management part 12 and the acquired section available band, as a section provisional band. Then, the communication path management part 13 notifies the acquired section provisional band as a section request band to the communication path management part 23, 33 included by a communication device (in this exemplary embodiment, the relay-point device 20, the relay-point device 30) configuring a downstream section in a direction (a first direction) in which data is transmitted in the target communication path.

Figure 8:
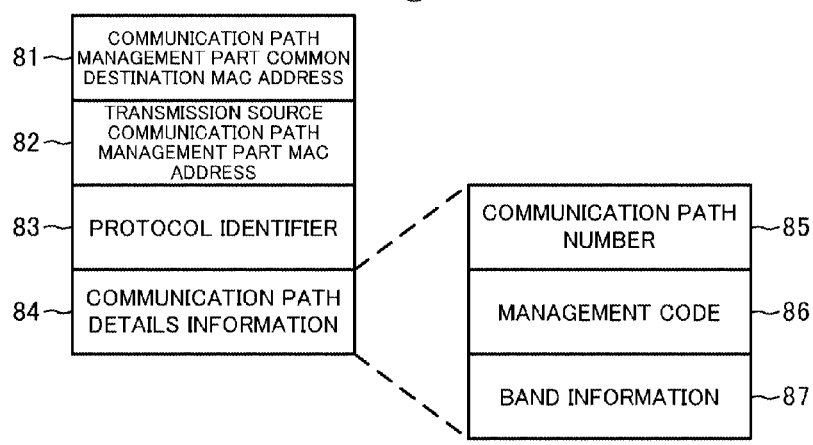
FIG. 8 is an explanatory diagram conceptually showing a band reserving packet according to the first exemplary embodiment of the present invention.

In is exemplary embodiment, the section request band is transmitted in a state of being contained in a band reserving packet as shown in FIG. 8. Moreover, a communication path determined band to be described later is also transmitted in a state of being contained in a band reserving packet in the same manner as the section request band.

The band reserving packet includes a communication path management part common destination MAC address 81, a transmission source communication path management part MAC address 82, a protocol identifier 83, and communication path details information 84.

The communication path management part common destination MAC address 81 is a MAC address which is used in common (i.e., previously set) in the communication system 1 when a communication path management part transmits the band reserving packet to another communication path management part included by an adjacent communication device in a communication path. For example, the communication path management part common destination MAC address 81 is "01-80-C2-00-00-02."

The transmission source communication path management part MAC address 82 is a MAC address assigned to a communication path management part that is the source of transmission of the band reserving packet. The protocol identifier 83 is an identifier representing that the packet is a band reserving packet (i.e., a preset identifier). For example, the protocol identifier 83 is "88-09-0A."

The communication path details information 84 contains a communication path number 85, a management code 86, and band information 87.

The communication path number 85 is information for identifying a communication path which is the target of reserving a communication band. The management code 86 is preset information representing that the band reserving packet contains a section request band, or preset information representing that the band reserving packet contains a communication path determined band.

The band information 87 is a section request band or a communication path determined band. For example, in a case where the sec (request band is 30 Mbps, the band information 87 is "0×1E," or the like.

When the section request band is notified from the upstream side in the first direction, the communication path management part 23 acquires line band information from the line controller 25 in the same manner as the communication path management part 13.

The line controller 25 outputs line band information representing the maximum communication band that is available in the communication line CL2 connected with the line controller 25, to the communication path management part 23.

The communication path management part 23 acquires the sum of communication bands that are already reserved in the target communication path (reserved communication bands), based on the table shown in FIG. 5. Then, the communication path management part 23 acquires a value as a result of subtracting the sum of the reserved communication bands from a communication band represented by the acquired line band information, as a section available band that is an available communication band in the communication line CL2.

Next, the communication path management part 23 acquires the smallest value between the notified section request band and the acquired section available band, as a section provisional band. Then, the communication path management part 23 notifies the acquired section provisional band as a section request band to the communication path management part 43 included by a communication device (in this exemplary embodiment, the end-point device 40) configuring a downstream section in the first direction.

Likewise, when the section request band is notified from the upstream side in the first direction, the communication path management part 33 acquires line band information from the line controller 35 in the same manner as the communication path management part 13.

The line controller 35 outputs line band information representing the maximum communication band that is available in the communication line CL4 connected with the line controller 35, to the communication path management part 33.

The communication path management part 33 acquires the sum of communication bands that are already reserved in the target communication path (reserved communication bands), based on the table shown in FIG. 6. Then, the communication path management part 33 acquires a value as a result of subtracting the sum of the reserved communication bands from the communication band represented by the acquired line band information, as a section available band that is an available communication band in the communication line CL4.

Next, the communication path management part 33 acquires the smallest value between the notified section request band and the acquired section available band, as a section provisional band. Then, the communication path management part 33 notifies the acquired section provisional band as a section request band to the communication path management part 43 included by a communication device (in this exemplary embodiment, the end-point device 40) configuring a downstream section in the first direction.

When the section request band is notified from the upstream side in the first direction, the communication path management part 43 acquires the section request band as a communication path determined band.

According to this, for example, a management device can reduce a processing load on a specific device as compared with a case of acquiring section available bands for all sections. Moreover, it is possible to reduce a communication load for transmitting the section available bands.

Then, the communication path management part 43 notifies the acquired communication path determined band to the communication path management part 23, 33 included by a communication device (in this exemplary embodiment, the relay-point device 20, the relay-point device 30) configuring an upstream section in the first direction.

When the communication path determined band is notified from the downstream side in the first direction, the communication path management part 23 reserves the communication path determined band in the communication line CL2 (section) connected with the communication device having notified the communication path determined band. The communication path management part 23 updates the reserved communication band in the table shown in FIG. 5.

Then, the communication path management part 23 notifies the communication path determined band to the communication path management part 13 included by a communication device (in this exemplary embodiment, the starting-point device 10) configuring an upstream section in the first direction.

Likewise, when the communication path determined band is notified from the downstream side in the first direction, the communication path management part 33 reserves the communication path determined band in the communication line CL4 (section) connected with the communication device having notified the communication path determined band. The communication path management part 33 updates the reserved communication band in the table shown in FIG. 6.

Then, the communication path management part 33 notifies the communication path determined band to the communication path management part 13 included by a communication device (in this exemplary embodiment, the starting-point device 10) configuring an upstream section in the first direction.

Likewise, when the communication path determined band is notified from the downstream side in the first direction, the communication path management part 13 reserves the communication path determined band in the communication line CL1, CL3 (section) connecting the communication device having notified the communication path determined band. The communication path management part 13 updates the reserved communication band in the table shown in FIG. 3.

According to this, it is possible to reduce a communication load for transmitting a communication path determined band.

Thus, for each section between communication devices adjacent to each other in a communication path, the communication system 1 acquires a section available band that is an available communication band in the section (part of a communication path determined band acquiring means). Moreover, the communication system 1 acquires the smallest value between the acquired section available band and a communication path request band that is a communication band requested for the communication path, as a communication path determined band (part of the communication path determined band acquiring means).

Further, the communication system 1 reserves the acquired communication path determined band in each of sections configuring a communication path, thereby reserving a communication path in the communication path (a band reserving means).

In addition, the communication system 1 transmits communication traffic satisfying a traffic flow condition including a condition that a transmission source communication device is the starting-point device 10 and a transmission destination communication device is the end-point device 40 so that the communication traffic passes through a communication path for which a communication path is reserved (a communication traffic controlling means).

(Operation)

Next, the operation of the abovementioned communication system 1 will be described referring to sequence diagrams shown in FIGS. 9 and 10.

Firstly, the switching management part 12 acquires the sum of flow request bands for traffic flow conditions in which transmission destination communication devices are the same (in this exemplary embodiment, the end-point device 10) and to which communication paths are not assigned yet, based on the table shown in FIG. 4. In this exemplary embodiment, the switching management part 12 acquires 70 Mbps as the sum of the flow request bands.

Next, the switching management part 12 extracts a communication path associated with the same end-point device (in this exemplary embodiment, the end-point device 40) as the transmission destination communication device provided in the abovementioned traffic flow conditions, based on the table shown in FIG. 3. In this exemplary embodiment, the switching management device 12 extracts a communication path passing through the starting-point device 10, the relay-point device 20 and the end-point device 40 in this order (a first communication path), and a communication path passing through the starting-point device 10, the relay-point device 30 and the end-point device 40 in this order (a second communication path).

Then, the switching management part 12 executes the band reservation process and the communication assignment process on each of the extracted communication paths in order of rank represented by a communication path priority associated with the communication path in the table shown in FIG. 3.

Therefore, in this exemplary embodiment, the switching management part 12 firstly executes the band reservation process and the communication assignment process on the first communication path.

To be specific, the switching management part 12 acquires the sum of flow request bands for traffic flow conditions in which transmission destination communication devices are the same (in this exemplary embodiment, the end-point device 40) and to which communication paths are not assigned yet, based on the table shown in FIG. 4. In this exemplary embodiment, the switching management part 12 acquires 70 Mbps as the sum of the flow request bands.

Figure 9:
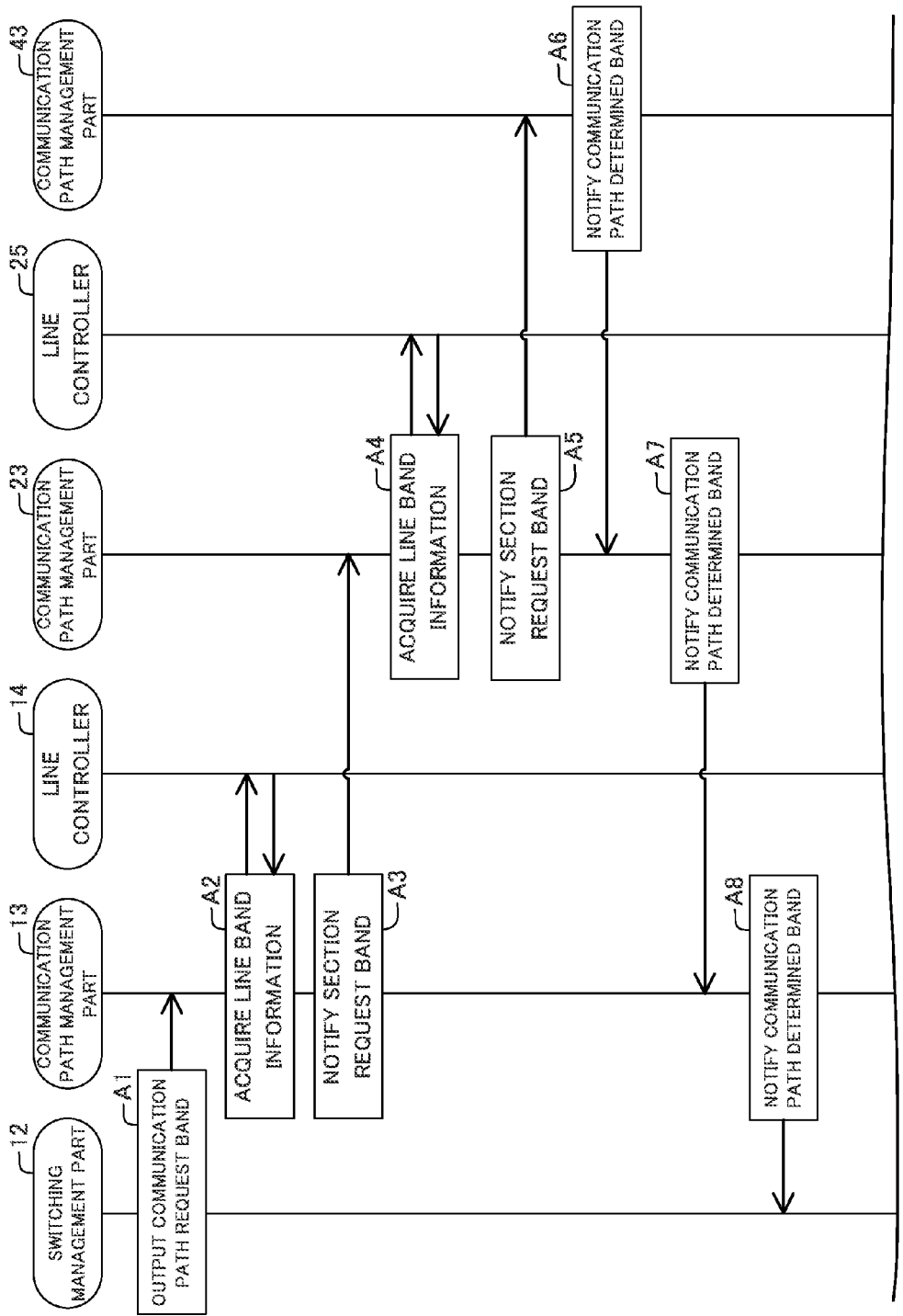
FIG. 9 is a sequence diagram showing the operation of the communication system according to the first exemplary embodiment of the present invention.

Then, the switching management part 12 outputs the acquired sum of the flow request bands (a communication path request band), and target communication path specification information for specifying the first communication path (a target communication path), to the communication path management part 13 (step A1 in FIG. 9).

Next, the communication path management part 13 specifies the communication line CL1 connected with the starting-point device 10 in the target communication path, based on the table shown in FIG. 3. Then, the communication path management part 13 acquires line band information from the line controller 14 that the specified communication line CL1 is connected (step A2 in FIG. 9). In this exemplary embodiment, it is assumed that the communication path management part 13 acquires 100 Mbps as a communication band represented by the line band information.

Then, the communication path management part 13 acquires the sum of communication bands that are already reserved in the target communication path (reserved communication bands), based on the table shown in FIG. 3. At this point in time, the communication path management part 13 acquires 0 Mbps as the SUM of the reserved communication bands.

Next, the communication path management part 13 acquires a value (100 Mbps) as a result of subtracting the sum (0 Mbps) of the reserved communication bands from the communication band (100 Mbps) represented by the acquired line band information, as a section available band that is an available communication band in the communication line CL1.

Next, the communication path management part 13 acquires the smallest value (i.e., 70 Mbps) between the communication path request band (70 Mbps) and the acquired section available band (100 Mbps), as a section provisional band.

Then, the communication path management part 13 notifies the acquired section provisional band as a section request band to the communication path management 23 included by a communication device (the relay-point device 20) configuring a downstream section in a direction (a first direction) in which data is transmitted in the target communication path (step A3 in FIG. 9).

Next, when the section request band is notified from the communication path management part 13, the communication path management part 23 acquires line band information from the line controller 25 (step A4 in FIG. 9). In this exemplary embodiment, it is assumed that the communication path management part 23 acquires 30 Mbps as a communication band represented by the line hand information.

Then, the communication path management part 23 acquires the sum of communication bands that are already reserved in the target communication path (reserved communication bands), based on the table shown in FIG. 5. At this point in time, the communication path management part 23 acquires 0 Mbps as the sum of the reserved communication bands.

Next, the communication path management part 23 acquires a value (30 Mbps) as a result of subtracting the sum (0 Mbps) of the reserved communication bands from the communication band (30 Mbps) represented by the acquired line band information, as a section available band that is an available communication band in the communication line CL2.

Next, the communication path management part 23 acquires the smallest value (i.e., 30 Mbps) between the section request band (70 Mbps) and the acquired section available band (30 Mbps), as a section provisional band.

Then, the communication path management part 23 notifies the acquired section provisional band as a section request band to the communication path management part 43 included by a communication device (the end-point device 40) configuring a downstream section in a direction (the first direction) in which data is transmitted in the target communication path (step A5 in FIG. 9).

Next, when the section request band is notified from the communication path management part 23, the communication path management part 43 acquires the section request band as a communication path determined band. Then, the communication path management part 43 notifies the acquired communication path determined band (30 Mbps) to the communication path management part 23 included by a communication device (in this exemplary embodiment, the relay-point device 20) configuring an upstream section in a direction (the first direction) in which data is transmitted in the target communication path (step A6 in FIG. 9).

Then, when the communication path determined band is notified from the communication path management part 43, the communication path management part 23 reserves the communication path determined band (30 Mbps) in the communication line CL2 (section) connected with the communication device (the end-point device 40) having notified the communication path determined band. Moreover, the communication path management part 23 updates the reserved communication band in the table shown in FIG. 5 to the communication band having been reserved (30 Mbps).

Then, the communication path management part 23 notifies the communication path determined band (30 Mbps) to the communication path management part 13 included by a communication device (in this exemplary embodiment, the starting-point device 10) configuring an upstream section in a direction (the first direction) in which data is transmitted in the target communication path (step A7 in FIG. 9).

Next, when the communication path determined band is notified from the communication path management part 23, the communication path management part 13 reserves the communication path determined band (30 Mbps) in the communication line CL1 (section) connected with the communication device (the relay-point device 20) having notified the communication path determined band. The communication path management part 13 updates the reserved communication hand in the table shown in FIG. 3 to the communication band having been reserved (30 Mbps).

Then, the communication path management part 13 notifies the communication path determined band (30 Mbps) to the switching management part 12 (step A8 in FIG. 9).

Next, when the communication path determined band (30 Mbps) is notified from the communication path management part 13, the switching management part 12 assigns the target communication path to the traffic flow conditions in order of ranks represented by flow priories associated with the traffic flow conditions in the table shown in FIG. 4.

In this exemplary embodiment, the switching management part 12 firstly assigns the target communication path to a traffic flow condition corresponding to a traffic flow identified with a flow number FL#1. Herein, a flow request band for the traffic flow identified with the flow number FL#1 is 10 Mbps.

At this point in time, there is a traffic flow condition corresponding to a traffic flow identified with a flow number FL#2, as a traffic flow condition which is associated with a flow request band equal to or less than a portion (20 Mbps) not assigned to any traffic flow condition yet of the communication band (30 Mbps) reserved in the target communication path and to which a communication path is not assigned yet.

Therefore, the switching management part 12 subsequently assigns the target communication path to the traffic flow condition corresponding to the traffic flow identified with the flow number FL#2.

At this point in time, there is not a traffic flow condition which is associated with a flow request band equal to or less than a portion (0 Mbps) not assigned to any traffic flow condition yet of the communication band (30 Mbps) reserved in the target communication path and to which a communication path is not assigned yet.

Therefore, the switching management part 12 ends assignment of the target communication path. Then, the switching management part 12 generates flow distribution information that is information in which a traffic flow condition is associated with a communication path assigned to the traffic flow condition. In this exemplary embodiment, the switching management part 12 generates flow distribution information as shown in FIG. 11. Then, the switching management part 12 outputs the generated flow distribution information to the flow distributer 11 (step B1 in FIG. 10).

Figure 10:
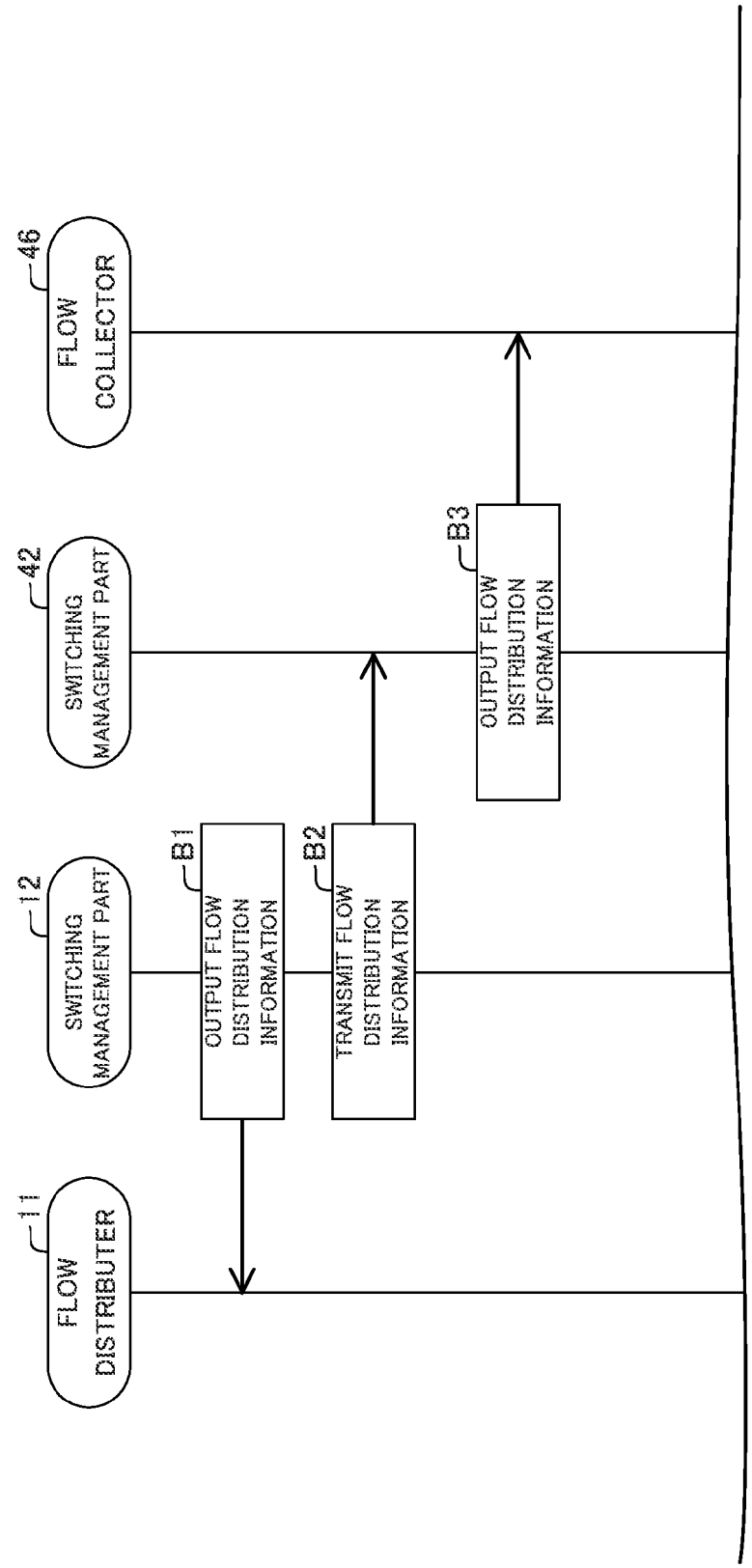
FIG. 10 is a sequence diagram showing the operation of the communication system according to the first exemplary embodiment of the present invention.

Further, the switching management part 12 transmits the generated flow distribution information to the end-point device 40 via the target communication path (step B2 in FIG. 10). Upon receiving the flow distribution information from the switching management part 12, the switching management part 42 outputs the flow distribution information to the flow collector 16 (step B3 in FIG. 10).

Then, the switching management part 12 determines whether or not communication paths are assigned to all of the traffic flow conditions. At this point in time, a communication path is not assigned yet to a traffic flow condition corresponding to a traffic flow identified with a flow number FL#3.

Therefore, the switching management part 12 executes the band reservation process and the communication path assignment process on the second communication path.

To be specific, the switching management part 12 acquires the sum of flow request bands for traffic flow conditions in which transmission destination communication devices are the same (in this exemplary embodiment, the end-point device 10) and to which communication paths are not assigned yet, based on the table shown in FIG. 4. In this exemplary embodiment, the switching management part 12 acquires 40 Mbps as the sum of the flow request bands.

Then, the switching management part 12 executes the same process as in the abovementioned case (the same steps as steps A1 to A8 in FIG. 9), thereby reserving a communication band in the second communication path. In this exemplary embodiment, it is assumed that a communication band of 40 Mbps or more is available in both the communication lines CL3 and CL4.

In this case, the communication system 1 acquires 40 Mbps as a communication path determined band for the second communication path, and reserves the communication path determined band (40 Mbps) in the second communication path.

Next, the switching management part 12 assigns a target communication path to a traffic flow condition as in the abovementioned case. At this point in time, the switching management part 12 assigns the target communication path to the traffic flow condition corresponding to the traffic flow identified with the flow number FL#3.

Then, the switching management part 12 generates flow distribution information in which a traffic flow condition is associated with a communication path assigned to the traffic flow condition. At this point in time, the switching management part 12 generates flow distribution information as shown FIG. 12. Then, the switching management part 12 executes the same process as in the abovementioned case (the same steps as steps B1 to B3 in FIG. 10), thereby notifying the generated flow distribution information to the flow distributer 11 and the flow collector 46, respectively.

At this point in time, communication paths are assigned to all of the traffic flow conditions. Therefore, the switching management part 12 stops executing the band reservation process and the communication path assignment process.

After that, the flow distributer 11 receives communication traffic from the outside of the communication system 1. Then, the flow distributer 11 specifies a traffic flow condition that the received communication traffic satisfies. Next, the flow distributer 11 specifies a communication path associated with the specified traffic flow condition, based on flow distribution information.

Then, the flow distributer 11 transmits the received communication traffic to the relay-point device 20, 30 adjacent to the starting-point device 10 in the communication path so that the communication traffic passes through the specified communication path. In this exemplary embodiment, the flow distributer 11 provides the communication traffic with a communication path identifier for identifying the specified communication path, and thereafter, transmits the communication traffic.

Further, the flow collector 46 receives communication traffics from the relay-point devices 20 and 30. Then, the flow collector 46 collects (aggregates) the received communication traffics based on the flow distribution information, and transmits the collected communication traffics to the outside of the communication system 1.

As described above, according to the communication system 1 in the first exemplary embodiment of the present invention, the communication system 1 acquires a section available band for each section, and acquires a communication path determined band for a communication path based on the acquired section available band. Then, the communication system 1 reserves a communication band in the communication path based on the acquired communication path determined band.

Further, the communication system 1 transmits communication traffic satisfying a traffic flow condition, through a communication path in which a communication band is reserved. As a result, according to the communication system 1, it is possible to transmit communication traffic through an appropriate communication path The communication system 1 according to a modified example of the first exemplary embodiment may be configured so that the communication device 10 further includes a flow collector and the communication device 40 further includes a flow distributer. In this case, the communication system 1 is configured to transmit communication traffic through an appropriate communication path not only in communication in one direction but also in communication in both directions.

That is, in this case, for communication in the first direction, the communication system 1 has a communication path in which the communication device 10 is a starting-point device and the communication device 40 is an end-point device, and executes the same process as the communication system 1 according to the first exemplary embodiment on the communication path. Moreover, for communication in the second direction opposite to the first direction, the communication system 1 has a communication path in which the communication device 40 is a starting-point device and the communication device 10 is an end-point device, and executes the same process as the communication system 1 according to the first exemplary embodiment on the communication path.

Second Exemplary Embodiment

Next, a communication system according to a second exemplary embodiment of the present invention will be described. The communication system according to the second exemplary embodiment is different from the communication system according to the first exemplary embodiment in that the communication system according to the second exemplary embodiment is configured to reserve a communication band again in the event of change of a section available band. Therefore, a description will be made below focusing on the different point.

The communication system 1 according to the second exemplary embodiment is configured to, in the event of change of a section available band, reacquire a communication path determined band based on the changed section available band and reserve the acquired communication path determined band anew in a communication path.

The line controllers 14, 15, 25 and 35 according to the second exemplary embodiment are each configured to output line band information in the event of change of line band information.

Further, the communication path management parts 13, 23 and 33 according to the second exemplary embodiment are each configured to execute the same processes as those shown in FIGS. 9 and 10 again upon acquiring line band information.

Next, the operation of the communication system 1 configured as described above will be described referring to a sequence diagram shown in FIG. 13.

Herein, it is assumed that, after a communication band of 30 Mbps is reserved in the first communication path, the maximum communication band available in the communication line CL2 decreases from 30 Mbps to 10 Mbps.

In this case, the line controller 25 outputs line band information representing 10 Mbps to the communication path management part 23. Thus, the communication path management part 23 acquires the line band information (step C1 in FIG. 13).

Then, the communication path management part 23 reacquires a value (10 Mbps) as a result of subtracting the sum (0 Mbps) of reserved communication bands from the communication band (10 Mbps) represented by the acquired line band information, as a section available band that is a communication band available in the communication line CL2.

Next, the communication path management part 23 acquires the smallest value (i.e., 10 Mbps) between a communication path determined band (30 Mbps) and the acquired section available band (10 Mbps), as a section provisional band.

Figure 13:
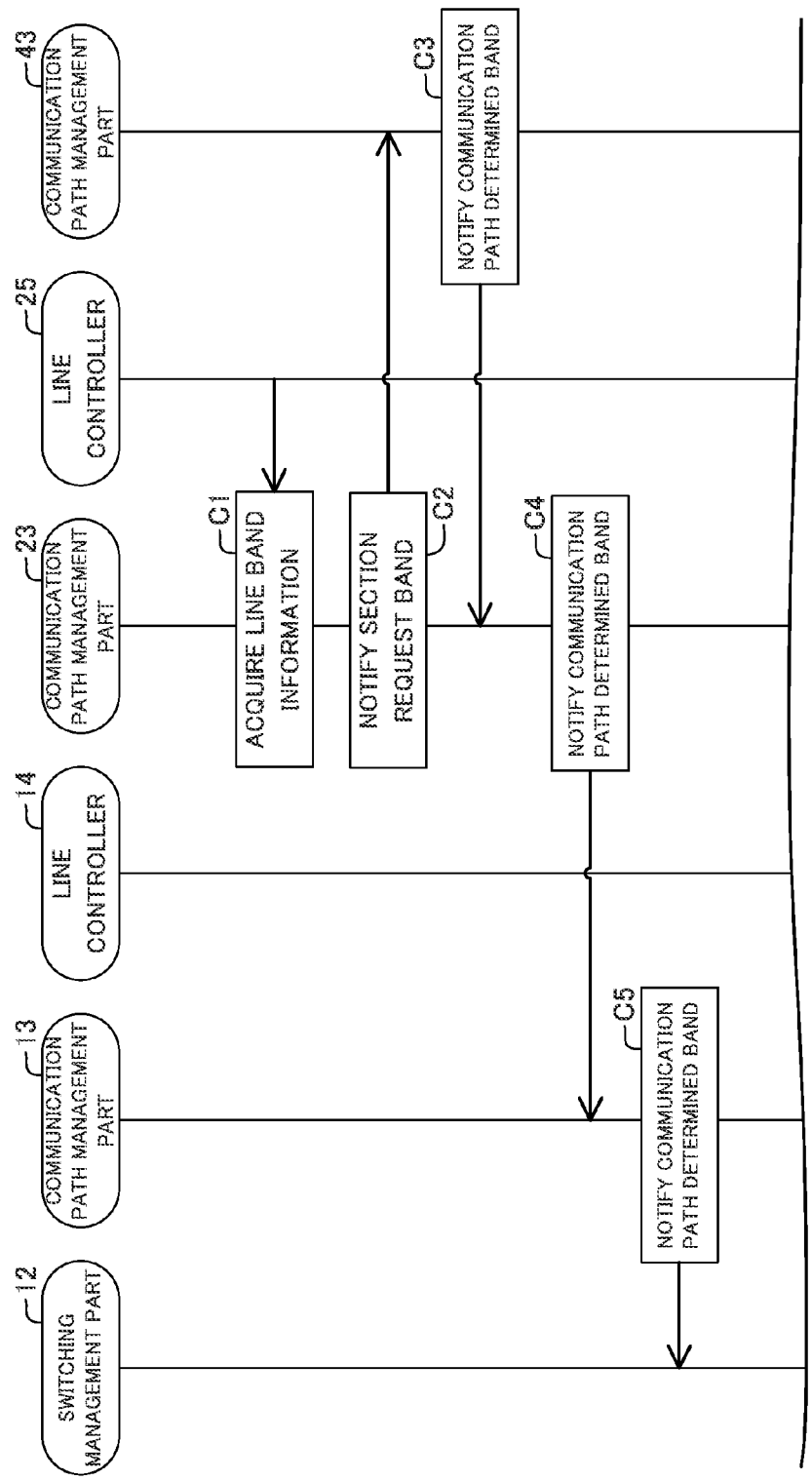
FIG. 13 is a sequence diagram showing the operation of a communication system according to a second exemplary embodiment of the present invention.

Then, the communication path management part 23 notifies the acquired section provisional band as a section request band to the communication path management part 43 included by a communication device (the end-point device 40) configuring a downstream section in the direction (the first direction) that data is transmitted in the target communication path (step C2 in FIG. 13).

Next, when the section request band is notified from the communication path management part 23, the communication path management part 43 acquires the section request band as a communication path determined band. Then, the communication path management part 43 notifies the acquired communication path determined band (10 Mbps) to the communication path management part 23 included by a communication device (in this exemplary embodiment, the relay-point device 20) configuring an upstream section in the direction (the first direction) that data is transmitted in the target communication path (step C3 in FIG. 13).

Then, when the communication path determined band is notified from the communication path management part 43, the communication path management part 23 reserve the communication path determined band (10 Mbps) anew in the communication line CL2 (section) connected to the communication device (the end-point device 40) having notified the communication path determined band. Moreover, the communication path management part 23 updates the reserved communication band in the table shown in FIG. 5 to the communication band having been reserved (10 Mbps).

Then, the communication path management part 23 notifies the communication path determined band (10 Mbps) to the communication path management part 13 included by a communication device (in this exemplary embodiment, the starting-point device 10) configuring an upstream section in the direction (the first direction) that data is transmitted in the target communication path (step C4 in FIG. 13).

Next, when the communication path determined band is notified from the communication path management part 23, the communication path management part 13 reserve the communication path determined band (10 Mbps) anew in the communication line CL1 (section) connected to the communication device (the relay-point device 20) having notified the communication path determined band. The communication path management part 13 updates the reserved communication band in the table shown in FIG. 3 to the communication band having been reserved (10 Mbps).

Then, the communication path management part 13 notifies the communication path determined band (10 Mbps) to the switching management part 12 (step C5 in FIG. 13).

Then, the switching management part 12 reassigns the first communication path to the traffic flow condition corresponding to the traffic flow identified with the flow number FL#1 again. Herein, the flow request band for the traffic flow identified with the flow number FL#1 is 10 Mbps.

In this case, it is impossible to assign the first communication path to the traffic flow condition corresponding to the traffic flow identified with the flow number FL#2. Therefore, in this case, the sum of flow request bands for traffic flow conditions to which communication paths are not assigned yet is 60 Mbps.

Then, the switching management part 12 uses 60 Mbps as a communication path request band to execute a process for reserving a communication band in the second communication path. Herein, it is assumed that a communication band of 60 Mbps or more is available in both the communication line CL3 and the communication line CL4.

In this case, a communication band of 60 Mbps is reserved in the second communication path. After that, the switching management part 12 assigns the second communication path to the traffic flow condition corresponding to the traffic flow identified with the flow number FL#2 and the traffic flow condition corresponding to the traffic flow identified with the flow number FL#3, respectively.

Thus, according to the communication system 1 of the second exemplary embodiment, it is possible to transmit communication traffic through an appropriate communication path even in the event of change of a section available band.

It is favorable that, even in the event of change of a communication band available in a communication line, the communication system 1 according to the second exemplary embodiment operates in the same manner as when the communication band available in the communication line is the maximum.

Third Exemplary Embodiment

Next, a communication system according to a third exemplary embodiment of the present invention will be described. The communication system according to the third exemplary embodiment is different from the communication system according to the first exemplary embodiment in that the communication system according to the third exemplary embodiment is configured to reserve a communication band again in the event of change of a section available band. Therefore, a description will be made below focusing on the different point.

The communication system according to the third exemplary embodiment is configured to, in the event of change of a section available band, reacquire a communication path determined band based on the changed section available band and reserve the acquired communication path determined band anew in a communication path.

Figure 14:
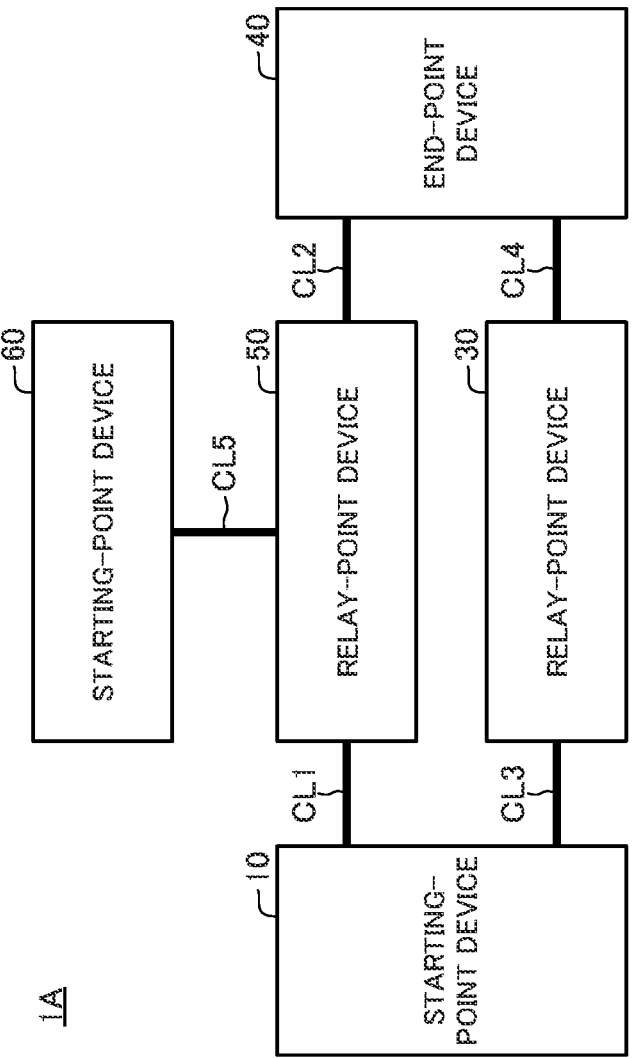
FIG. 14 is a diagram showing a schematic configuration of a communication system according to a third exemplary embodiment of the present invention.

As shown in FIG. 14, a communication system 1A according to the third exemplary embodiment includes a plurality of (in this exemplary embodiment, five) communication devices 10, 30, 40, 50 and 60. Meanwhile, the communication system 1A may include six or more communication devices.

The communication device 10 and the communication device 50 are connected so as to be capable of communicating with each other via the communication line CL1. Likewise, the communication device 50 and the communication device 40 are connected so as to be capable of communicating with each other via the communication line CL2.

Further, the communication device 10 and the communication device 30 are connected so as to be capable of communicating with each other via the communication line CL3. Likewise, the communication device 30 and the communication device 40 are connected so as to be capable of communicating with each other via the communication line CL4.

Further, the communication device 60 and the communication device 50 are connected so as to be capable of communicating with each other via a communication line CL5.

In this exemplary embodiment, the communication device 10 and the communication device 60 each configure a starting-point device. The communication device 40 configures an end-point device. The communication device 50 and the communication device 30 each configure a relay-point device.

In the communication system 1A, the starting-point device 10 and the end-point device 40 are connected so as to be capable of communicating through the relay-point device 50 and the first communication path is thereby configured. Likewise, in the communication system 1A, the starting-point device 10 and the end-point device 40 are connected so as to be capable of communicating through the relay-point device 30 and the second communication path is thereby configured.

Further, in the communication system 1A, the starting-point device 60 and the end-point device 40 are connected so as to be capable of communicating through the relay-point device 50 and a third communication path is thereby configured. In other words, in the communication system 1A, a plurality of (in this exemplary embodiment, three) communication paths are configured.

The starting-point device 10 and the starting-point device 60 each have the same configuration as the starting device 10 according to the first exemplary embodiment. That is, the starting-point device 60 includes a flow distributer 61, a switching management part 62, a communication path management part 63, and line controllers 64 and 65.

Further, the end-point device 40 has the same configuration as the end-point device 40 according to the first exemplary embodiment. Also, the relay-point device 30 has the same configuration as the relay-point device 30 according to the first exemplary embodiment.

Figure 15:
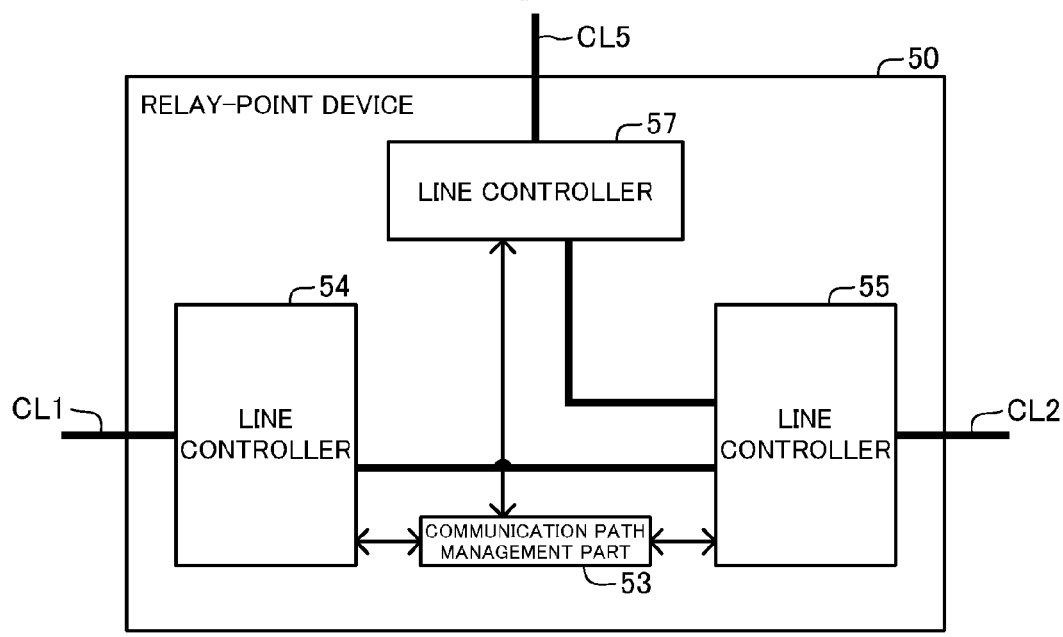
FIG. 15 is a diagram showing a schematic configuration of a relay-point device according to the third exemplary embodiment of the present invention.

The relay-point device 50 includes a communication path management part 53, and three line controllers 54, 55 and 57 as shown in FIG. 15. The communication path management part 53 has the same configuration as the communication path management part 23 according to the first exemplary embodiment. Also, the line controllers 54, 55 and 57 each have the same configuration as the line controller 24, 25 according to the first exemplary embodiment.

In a case where the starting-point device 60 newly accepts flow information corresponding to communication traffic passing through the third communication path partly sharing a section with the first communication line after a communication band is reserved in the first communication path, the communication system 1A acquires a communication path determined band for the third communication path based on the flow information, and reserves the acquired communication path determined band in the third communication path.

Then, when a section available band in the section configuring the first communication path is changed as a result of reserving the communication band in the third communication path, the communication system 1A reacquires a communication path determined band for the first communication path based on the changed section available band, and reserves the acquired communication path determined band anew in the first communication path.

Next, the operation of the communication system 1A configured as described above will be described referring to a sequence diagram shown in FIG. 16.

Firstly, it is assumed that a section available band in the communication line CL2 is 30 Mbps and a communication band of 30 Mbps is reserved in the first communication path. Moreover, it is assumed that the relay-point device 50 stores communication path information shown in FIG. 17.

It is assumed that, afterward, the starting-point device 60 newly accepts flow information shown in FIG. 18 and communication path information shown in FIG. 19.

In this case, the switching management part 62 executes the band reservation process and the communication path assignment process on the third communication path.

To be specific, the switching management part 62 firstly acquires 20 Mbps as the sum of flow request bands. Then, the switching management part 62 outputs the acquired sum of the flow request bands (a communication path request band) and target communication path specification information for specifying the third communication path (a target communication path), to the communication path management part 63.

Then, the communication path management part 63 acquires line band information from the line controller 57 that the specified communication line CL5 is connected. In this exemplary embodiment, it is assumed that the communication path management part 63 acquires 20 Mbps as a communication band represented by the line band information.

Then, the communication path management part 63 acquires 0 Mbps as the sum of reserved communication bands. Next, the communication path management part 63 acquires a value (20 Mbps) as a result of subtracting the sum (0 Mbps) of the reserved communication bands from the acquired communication band (20 Mbps) represented by the line band information, as a section available band that is a communication band available in the communication line CL5.

Next, the communication path management part 63 acquires the smallest value (i.e., 20 Mbps) between the communication path request band (20 Mbps) and the acquired section available band (20 Mbps), as a section provisional band.

Then, the communication path management part 63 notifies the acquired section provisional band as a section request band to the communication path management part 53 included by a communication device (the relay-point device 50) configuring a downstream section in the direction (the first direction) that data is transmitted in the target communication path (the third communication path).

Next, when the section request band is notified from the communication path management part 63, the communication path management part 53 acquires line band information from the line controller 55. In this exemplary embodiment, it is assumed that the communication path management part 53 acquires 30 Mbps as a communication band represented by the line band information.

As shown in FIG. 17, a communication path priority associated with a communication path (the third communication path) identified with a communication path number CP#3 is higher than a communication path priority associated with the communication path (the first communication path) identified with the communication path number CP#1 (i.e., the value of the communication priority associated with the third communication path is smaller than that of the communication priority associated with the first communication path).

Therefore, the communication path management part 53 acquires the section provisional band for the third communication path associated with the highest communication path priority. In this exemplary embodiment, the communication path management part 53 acquires the smallest value (i.e., 20 Mbps) between the section request band (20 Mbps) and the section available band (30 Mbps), as the section provisional band for the third communication path.

Next, the communication path management part 53 acquires a section provisional band for the first communication path associated with the smaller communication path priority. In this exemplary embodiment, the communication path management part 53 acquires the smallest value (i.e., 10 Mbps) between the communication path determined band (30 Mbps) and the section available band (10 Mbps), as the section provisional band for the first communication path. The section available band for the first communication path is a value as a result of subtracting the section provisional band (20 Mbps) for the third communication path from the communication band (30 Mbps) represented by the line band information.

Then, the communication path management part 53 notifies the section provisional band (the section request band; 10 Mbps) for the first communication path and the section provisional band (the section request band; 20 Mbps) for the third communication path, to the communication path management part 43.

Next, the communication path management part 43 acquires 10 Mbps as a communication path determined band for the first communication path, and also acquires 20 Mbps as a communication path determined band for the third communication path.

Then, the communication path management part 43 notifies the communication path determined band (10 Mbps) for the first communication path and the communication path determined band (20 Mbps) for the third communication path, to the communication path management part 53 (step D1 in FIG. 16).

Next, the communication path management part 53 reserves the communication path determined band (10 Mbps) in the communication line CL2 for the first communication path, and also reserves the communication path determined band (20 Mbps) in the communication line CL2 for the third communication path. Then, the communication path management part 53 updates the reserved communication bands in the communication path information to the communication bands having been reserved as shown in FIG. 20.

Then, the communication path management part 53 notifies the communication path determined band (20 Mbps) for the third communication path to the communication path management part 63 (step D2 in FIG. 16).

Next, the communication path management part 63 reserves the communication path determined band (20 Mbps) in the communication line CL5. Then, the communication path management part 63 updates the reserved communication band in the communication path information to the communication band having been reserved (20 Mbps). Then, the communication path management part 63 notifies the communication path determined band (20 Mbps) to the switching management part 62 (step D3 in FIG. 16).

Next, the switching management part 62 assigns the third communication path to a traffic flow condition corresponding to a traffic flow identified with a flow number FL#4.

Further, the communication path management part 53 notifies the communication path determined band (10 Mbps) for the first communication path to the communication path management part 13 (step D4 in FIG. 16).

Next, the communication path management part 53 reserves the communication path determined band (10 Mbps) anew in the communication line CL1. Then, the communication path management part 13 updates the reserved communication band in the communication path information to the communication band (10 Mbps) having been reserved. Then, the communication path management part 13 notifies the communication path determined band (10 Mbps) to the switching management part 12 (step D5 in FIG. 16).

Next, the switching management part 12 reassigns the first communication path to the traffic flow condition corresponding to the traffic flow identified with the flow number FL#1.

In this case, it is impossible to assign the first communication path to the traffic flow condition corresponding to the traffic flow identified with the flow number FL#2. Therefore, in this case, the sum of flow request bands for traffic flow conditions to which communication paths are not assigned yet is 60 Mbps.

Then, the switching management part 12 uses 60 Mbps as a communication path request band to execute a process for reserving a communication band in the second communication path. Herein, it is assumed that a communication band of 60 Mbps or more is available in both the communication line CL3 and the communication line CL4.

In this case, a communication band of 60 Mbps is reserved in the second communication path. After that, the switching management part 12 assigns the second communication path to the traffic flow condition corresponding to the traffic flow identified with the flow number FL#2 and the traffic flow condition corresponding to the traffic flow identified with the flow number #3, respectively.

Thus, according to the communication system 1A of the third exemplary embodiment, it is possible to transmit communication traffic through an appropriate communication path even in the event of change of a section available band.

Fourth Exemplary Embodiment

Next, a communication system according to a fourth exemplary embodiment of the present invention will be described. The communication system according to the fourth exemplary embodiment is different from the communication system according to the first exemplary embodiment in that the communication system according to the fourth exemplary embodiment is configured to reserve a communication band again based on an available communication band other than an already reserved communication band. Therefore, a description will be made below focusing on the different point.

The communication path management parts 13, 23, 33 and 43 according to the fourth exemplary embodiment each acquire a section additionally available band every time a preset acquisition period passes (part of a communication path additionally available band acquiring means). A section additionally available band is an available communication band other than a reserved communication band in a section configuring a communication path after reservation of the communication band.

The communication system 1 according to the fourth exemplary embodiment acquires the smallest value of section additionally available bands acquired for the respective sections configuring a communication path, as a communication path additionally available band for the communication path (part of the communication path additionally available band acquiring means).

The communication system 1 according to the fourth exemplary embodiment reserves a communication band in the communication path anew based on the communication path additionally available band acquired for the communication path.

Next, the operation of the communication system 1 configured as described above will be described referring to a sequence diagram shown in FIG. 21.

Herein, it is assumed that, as shown in FIG. 22, a communication band of 30 Mbps is reserved in the communication path (the first communication path) identified with the communication path number CP#1 and also a communication path of 40 Mbps is reserved in the communication path (the second communication path) identified with the communication number CP#2.

After that, the communication path management part 13 also acquires a section additionally available band in the communication line CL1 ever time the acquisition period passes (step E1 in FIG. 21). Herein, it is assumed that the communication path management part 13 acquires 70 Mbps as the section additionally available band.

Next, the communication path management part 13 notifies the acquired section additionally available band to the communication path management part 23 (step E2 in FIG. 21).

Figure 23:
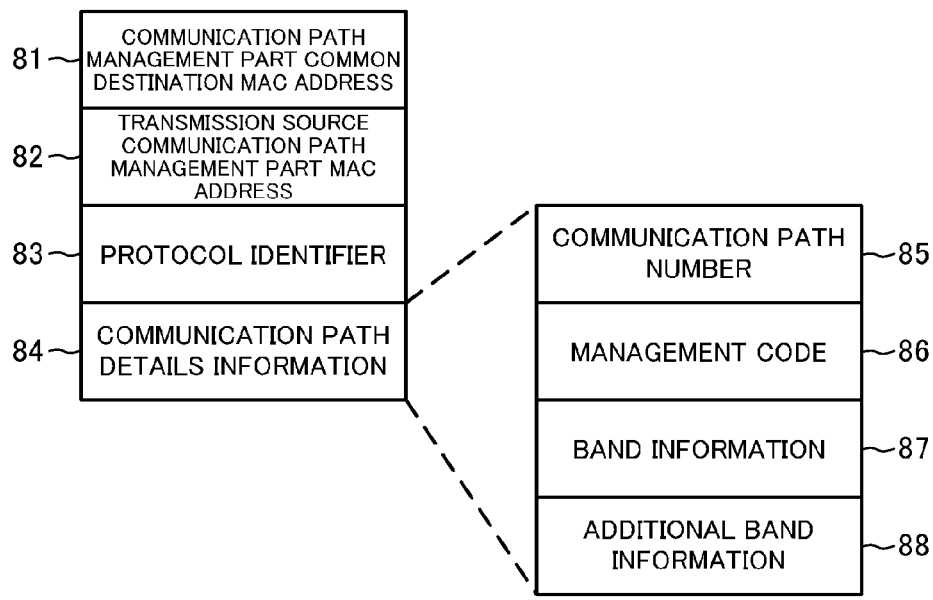
FIG. 23 is an explanatory diagram conceptually showing an additional band reserving packet according to the fourth exemplary embodiment of the present invention.

In this exemplary embodiment, a section additionally available band is transmitted in a state of being contained in an additional band reserving packet as shown in FIG. 23. Moreover, a communication path additionally available band to be described later is also transmitted in a state of being contained in the additional band reserving packet as with the section additionally available band.

An additional band reserving packet is a packet in which additional band information 88 is added to the communication path details information 84 of the band reserving packet shown in FIG. 8. The additional band information 88 is information representing a section additionally available band.

Further, the management code 86 is preset information representing that an additional band reserving packet contains a section additionally available band, or preset information representing that an additional band reserving packet contains a communication path additionally available band.

Then, when the section additionally available band is notified from the communication path management part 13, the communication path management part 23 acquires a section additionally available band in the communication line CL2 (step E3 in FIG. 21). Herein, it is assumed that the communication path management part 23 acquires 50 Mbps as the section additionally available band.

Next, the communication path management part 23 notifies the smallest value (i.e., 50 Mbps) between the notified section additionally available band (70 Mbps) and the acquired section additionally available band (50 Mbps), as a section additionally available band, to the communication path management part 43 (step E4 FIG. 21).

Next, when the section additionally available band is notified from the communication path management part 23, the communication path management part 43 acquires the section additionally available band as a communication path additionally available band. Then, the communication path management part 43 notifies the acquired communication path additionally available band (50 Mbps) to the communication path management part 23 (step E5 in FIG. 21).

When the communication path additionally available band (50 Mbps) is notified from the communication path management part 43, the communication path management part 23 notifies the communication path additionally available band to the communication path management part 13 (step E6 in FIG. 21).

When the communication path additionally available band (50 Mbps) is notified from the communication path management part 23, the communication path management part 13 notifies the communication path additionally available band to the switching management part 12 (step E7 in FIG. 21).

The switching management part 12 determines whether or not to reserve a communication band again in the first communication path, based on the sum (80 Mbps) of the sum (30 Mbps) of the communication bands already reserved in the first communication path and the notified communication path additionally available band (50 Mbps).

In this exemplary embodiment, the switching management part 12 can assign the first communication path to a traffic flow condition to which a communication path (in this exemplary embodiment, the second communication path) other than the first communication path is assigned, the switching management part 12 determines to reserve a communication band anew in the first communication band.

Then, switching management part 12 outputs 70 Mbps as a communication path request band and target communication path specification information for specifying the first communication path (a target communication path), to the communication path management part 13, thereby reserving a communication band anew in the first communication path. As a result, a communication band of 70 Mbps is reserved in the first communication path, and the first communication path is assigned to all of the traffic flow conditions.

Thus, according to the communication system 1 of the fourth exemplary embodiment, in a case where, after a communication band is reserved in a communication band, an available communication band other than the reserved communication band exists, it is possible to increase a communication band to be reserved in the communication path. That is, it is possible to effectively use an available communication band in the event of change of the available communication band.

Fifth Exemplary Embodiment

Next, a communication system according to a fifth exemplary embodiment of the present invention will be described. The communication system according to the fifth exemplary embodiment is different from the communication system according to the first exemplary embodiment in that the communication system according to the fifth exemplary embodiment is configured to communicate while having information relating to a plurality of communication paths contained in one packet. Therefore, a description will be made below focusing on the different point.

In a case where one section configures a plurality of communication paths, the communication system 1 according to the first exemplary embodiment communicates while having information (in this exemplary embodiment, communication path details information) relating to the plurality of communication paths contained in unit data (in this exemplary embodiment, a band reserving packet) having a predetermined format.

Figure 24:
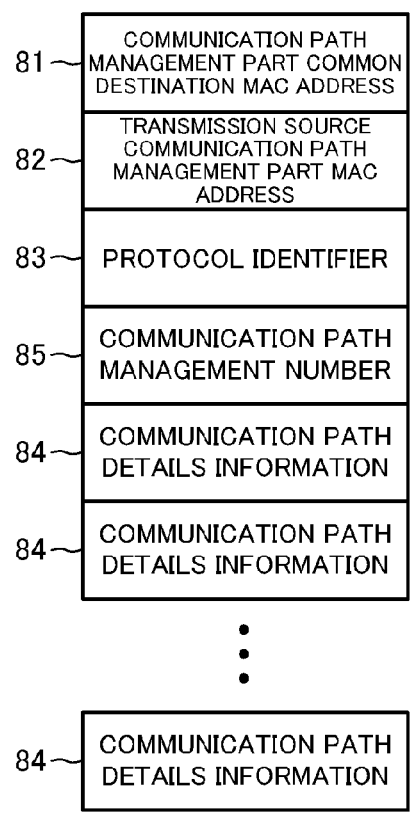
FIG. 24 is an explanatory diagram conceptually showing a band reserving packet according to a fifth exemplary embodiment of the present invention.

To be specific, as shown in FIG. 24, a band reserving packet according to the fifth exemplary embodiment contains a communication path management part common destination MAC address 81, a transmission source communication path management part MAC address 82, a protocol identifier 83, a communication path management number 85, and a plurality of communication path details information 84. The communication path management number 85 is information representing the number of the communication path details information 84 contained in the band reserving packet.

Therefore, according to the communication system 1 of the fifth exemplary embodiment, it is possible to reduce a communication load for transmitting information relating a communication path.

Sixth Exemplary Embodiment

Figure 25:
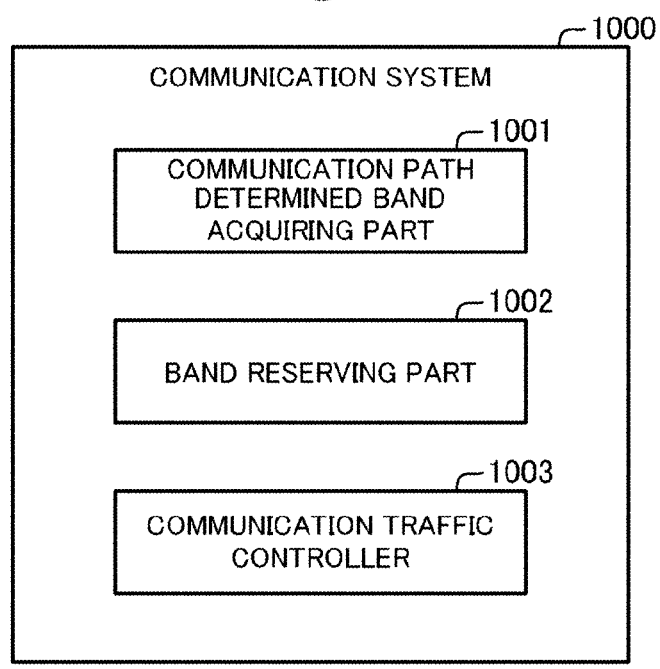
FIG. 25 is a diagram showing a schematic configuration of a communication system according to a sixth exemplary embodiment of the present invention.

Next, a communication system according to a sixth exemplary embodiment of the present invention will be described referring to FIG. 25.

A communication system 1000 according to the sixth exemplary embodiment is a system including a plurality of communication devices.

Moreover, in the communication system 1000, a communication path is configured in a manner that a starting-point device that is one of the plurality of communication devices, and an end-point device that is one of the communication devices other than the starting-point device of the plurality of communication devices, are connected so as to be capable of communicating via at least one relay-point device that is a communication device other than the starting-point device and the end-point device of the plurality of communication devices.

The communication system 1000 includes:

a communication path determined band acquiring part (a communication path determined band acquiring means) 1001 configured to, for each section between the mutually adjacent communication devices in the communication path, acquire a section available band that is a communication band available in the section, and acquire the smallest value between the acquired section available band and a communication path request band that is a communication band requested for the communication path, as a communication path determined band;

a band reserving part (a band reserving means) 1002 configured to reserve the acquired communication path determined band in each of sections configuring the communication path and thereby reserve a communication band in the communication path; and a communication traffic controller (a communication traffic controlling means) 1003 configured to transmit communication traffic satisfying a traffic flow condition including a condition that a transmission source communication device is the starting-point device and a transmission destination communication device is the end-point device so that the communication traffic passes through the communication path that the communication band is reserved.

According to this, the communication system 1000 acquires section available bands of the respective sections, and acquires a communication path determined band for a communication path based on the acquired section available bands. Then, the communication system 1000 reserves a communication band in the communication path based on the acquired communication path determined band. Moreover, the communication system 1000 transmits communication traffic satisfying a traffic flow condition through the communication path that the communication band is reserved. As a result, according to the communication system 1000, it is possible to transmit communication traffic through an appropriate communication path.

Although the present invention is described above referring to the exemplary embodiments, the present invention is not limited to the abovementioned exemplary embodiments. The configurations and details of the present invention can be changed and modified in various manners that can be understood by one skilled in the art within the scope of the present invention.

The respective functions of the communication device are realized by hardware such as circuits in each of the exemplary embodiments. Meanwhile, the communication device may include a processing device and a storage device that stores a program (software), and may be configured to realize the respective functions by execution of the program by the processing device. In this case, the program may be stored on a computer-readable recording medium. For example, the recording medium is a portable medium such as a flexible disk, an optical disk, a magneto-optical disk, and a semiconductor memory.

Further, as other modified examples of the exemplary embodiments, any combination of the abovementioned exemplary embodiments and modified example may be employed.

<Supplementary Notes>

The whole or part of the exemplary embodiments disclosed above can be described as, but not limited to, the following supplementary notes.

(Supplementary Note 1)

A communication system including a plurality of communication devices, the communication system having a communication path configured by connecting a starting-point device to an end-point device so as to be capable of communicating via at least one relay-point device, the starting-point device being one of the plurality of communication devices, the end-point device being one of the communication devices other than the starting-point device among the plurality of communication devices, and the relay-point device being a communication device other than the starting-point device and the end-point device among the plurality of communication devices, and the communication system including:

a communication path determined band acquiring means for, for each of sections between communication devices adjacent to each other in the communication path, acquiring a section available band that is a communication band available in the section, and acquiring, as a communication path determined band, a smallest value between the acquired section available band and a communication path request band that is a communication band requested for the communication path;

a band reserving means for reserving a communication band in the communication path by reserving the acquired communication path determined band in each of the sections configuring the communication path; and a communication traffic controlling means for transmitting communication traffic so that the communication traffic passes through the communication path where the communication band is reserved, the communication traffic satisfying a traffic flow condition including a condition that a transmission source communication device is the starting-point device and a transmission destination communication device is the end-point device.

According to this, a communication system acquires a section available band of each section, and acquires a communication path determined band for a communication path based on the acquired section available band. Then, the communication system reserves a communication band in the communication path based on the acquired communication path determined band. Moreover, the communication system transmits communication traffic satisfying a traffic flow condition through the communication path where the communication band is reserved. As a result, according to the communication system, it is possible to transmit communication traffic through an appropriate communication path.

(Supplementary Note 2)

The communication system according to Supplementary Note 1, wherein the communication path determined band acquiring means is configured so that:

a communication device configuring a most upstream section in a first direction in the communication path among the sections configuring the communication path acquires, as a section provisional band, a smallest value between the communication path request band and a section available band that is a communication band available in the section, and notifies the acquired section provisional band as a section request band to a communication device configuring a downstream section in the first direction;

a communication device configuring a section other than the most upstream section in the first direction and a most downstream section in the first direction among the sections configuring the communication path acquires, as a section provisional band, a smallest value between the section request band notified from upstream in the first direction and a section available band that is a communication band available in the section, and notifies the acquired section provisional band as a section request band to a communication device configuring a downstream section in the first direction; and a communication device configuring the most downstream section in the first direction among the sections configuring the communication path acquires the section request band notified from upstream in the first section, as the communication path determined band.

According to this, compared with a case where a management device acquires section available bands for all sections, it is possible to reduce a processing load on a specific device. Moreover, it is also possible to reduce a communication load for transmitting a section available hand.

(Supplementary Note 3)

The communication system according to Supplementary Note 2, wherein the band reserving means is configured so that:

the communication device configuring the most downstream section in the first direction among the sections configuring the communication path notifies the acquired communication path determined band to a communication device configuring an upstream section in the first direction;

a communication device configuring a section other than the most upstream section in the first direction and the most downstream section in the first direction among the sections configuring the communication path reserves, in the section, the communication path determined band notified from downstream in the first direction, and notifies the communication path determined band to a communication device configuring an upstream section in the first direction; and the communication device configuring the most upstream section in the first direction among the sections configuring the communication path reserves, in the section, the communication path determined band notified from downstream in the first direction.

According to this, it is possible to reduce a communication load for transmitting a communication path determined band.

(Supplementary Note 4)

The communication system according to any of Supplementary Notes 1 to 3, wherein the communication traffic controlling means is configured to assign the communication path where the communication band is reserved to each of the traffic flow conditions, and transmit communication traffic satisfying the traffic flow condition so that the communication traffic passes through the communication path assigned to the traffic flow condition.

(Supplementary Note 5)

The communication system according to Supplementary Note 4, wherein the communication path determined band acquiring means is configured to accept a flow request band that is a communication band necessary for transmitting the communication traffic satisfying the traffic flow condition, and determine the communication path request band based on the accepted flow request band.

(Supplementary Note 6)

The communication system according to Supplementary Note 5, wherein a plurality of the communication paths are configured.

the communication system being configured to:

execute a band reservation process on each of the communication paths in order, the band reservation process being to acquire the communication path determined band and reserve the acquired communication path determined band in the communication path; and use a sum of the flow request bands for the traffic flow conditions that the communication paths are not assigned yet, as the communication path request band for the communication path that is a target of the band reservation process.

(Supplementary Note 7)

The communication system according to Supplementary Note 6, wherein the communication device is configured to accept communication path information in which the communication path that the starting-point device is configured by the communication device is associated with the end-point device configuring the communication path, and execute the band reservation process on a communication path associated with a same end-point device as the transmission destination communication device provided in the traffic flow condition in the accepted communication path information.

(Supplementary Note 8)

The communication system according to Supplementary Note 6 or 7, wherein the communication path information is information in which the communication path is associated with a communication path priority representing a rank, the communication system being configured to execute the band reservation process on the communication path in order of rank represented by the communication path priority associated with the communication path in the accepted communication path information.

(Supplementary Note 9)

The communication system according to any of Supplementary Notes 4 to 8, wherein the communication traffic controlling means is configured to accept flow information in which the traffic flow condition is associated with a flow priority representing a rank, and assign the communication path to each of the traffic flow conditions in order of rank represented by the flow priority associated with the traffic flow condition in the accepted flow information.

(Supplementary Note 10)

The communication system according to any of Supplementary Notes 1 to 9, being configured to, in a case where the section available band is changed after the communication band is reserved, in the communication path, reacquire the communication path determined band based on the changed section available band, and reserve the acquired communication path determined band anew in the communication path.

(Supplementary Note 11)

The communication system according to any of Supplementary Notes 1 to 10, comprising a communication path additionally available band acquiring means for, after the communication band is reserved in the communication path, acquiring a section additionally available band for each of the sections configuring the communication path, and acquiring a smallest value of the acquired section additionally available bands as a communication path additionally available band, the section additionally available band being a communication band available in the section other than the reserved communication band.

wherein the band reserving means is configured to reserve a communication band anew in the communication path based on the acquired communication path additionally available band.

According to this, in a case where, after a communication band is reserved in a communication path, an available communication band other than the reserved communication band exists, it is possible to increase a communication band reserved in the communication path. That is, even when an available communication band is changed, it is possible to effectively use the available communication band.

(Supplementary Note 12)

The communication system according to any of Supplementary Notes 1 to 11, being configured to, in a case where one section configures a plurality of communication paths, communicate information on the plurality of communication paths in a state of being contained in one unit data having a predetermined format.

According to this, it is possible to reduce a communication load for transmitting information on a communication path.

(Supplementary Note 13)

A communication control method applied to a communication system including a plurality of communication devices, the communication system having a communication path configured by connecting a starting-point device to an end-point device so as to be capable of communicating via at least one relay-point device, the starting-point device being one of the plurality of communication devices, the end-point device being one of the communication devices other than the starting-point device among the plurality of communication devices, and the relay-point device being a communication device other than the starting-point device and the end-point device among the plurality of communication devices, the communication control method including:

for each of sections between communication devices adjacent to each other in the communication path, acquiring a section available band that is a communication band available in the section, and acquiring, as a communication path determined band, a smallest value between the acquired section available band and a communication path request band that is a communication band requested for the communication path;

reserving a communication band in the communication path by reserving the acquired communication path determined band in each of the sections configuring the communication path; and transmitting communication traffic so that the communication traffic passes through the communication path where the communication band is reserved, the communication traffic satisfying a traffic flow condition including a condition that a transmission source communication device is the starting-point device and a transmission destination communication device is the end-point device.

(Supplementary Note 14)

The communication control method according to Supplementary Note 13, wherein:

a communication device configuring a most upstream section in a first direction in the communication path among the sections configuring the communication path acquires, as a section provisional band, a smallest value between the communication path request band and a section available band that is a communication band available in the section, and notifies the acquired section provisional band as a section request band to a communication device configuring a downstream section in the first direction;

a communication device configuring a section other than the most upstream section in the first direction and a most downstream section in the first direction among the sections configuring the communication path acquires, as a section provisional band, a smallest value between the section request band notified from upstream in the first direction and a section available band that is a communication band available in the section, and notifies the acquired section provisional band as a section request band to a communication device configuring a downstream section in the first direction; and a communication device configuring the most downstream section in the first direction among the sections configuring the communication path acquires the section request band notified from upstream in the first section, as the communication path determined band.

(Supplementary Note 15)

The communication control method according to Supplementary Note 14, wherein:

the communication device configuring the most downstream section in the first direction among the sections configuring the communication path notifies the acquired communication path determined band to a communication device configuring an upstream section in the first direction;

a communication device configuring a section other than the most upstream section in the first direction and the most downstream section in the first direction among the sections configuring the communication path reserves, in the section, the communication path determined band notified from downstream in the first direction, and notifies the communication path determined band to a communication device configuring an upstream section in the first direction; and the communication device configuring the most upstream section in the first direction among the sections configuring the communication path reserves, in the section, the communication path determined band notified from downstream in the first direction.

The present invention is based upon and claims the benefit of priority from Japanese patent application No. 2012-102965, filed on Apr. 27, 2012, the disclosure of which is incorporated herein in its entirety by reference.

INDUSTRIAL APPLICABILITY

The present invention can be applied to, for example, a communication system including a plurality of communication devices.

DESCRIPTION OF REFERENCE NUMERALS 1 communication system
10, 20, 30, 40 communication device
11 flow distributer
12, 42 switching management part
13, 23, 33, 43 communication path management part
14, 15, 24, 25, 34, 35, 44, 45 line controller
46 flow collector
1A communication system
50 communication device
53 communication path management part
54, 55, 57 line controller
60 communication device
61 flow distributer
62 switching management part
63 communication path management part
64, 65 line controller
1000 communication system
1001 communication path determined band acquiring part
1002 band reserving part
1003 communication traffic controller
CL1 to CL5 communication line

The invention claimed is:

1. A communication System comprising a plurality of communication devices,
the communication system having a communication path configured by connecting a Starting-point device to an end-point device so as to be capable of communicating via at least one relay-point device, the starting-point device being one of the plurality of communication devices, the end-point device being one of the communication devices other than the starting-point device among the plurality of communication devices, and the relay-point device being a communication device other than the starting-point device and the end-point device among the plurality of communication devices, and
the communication system comprising:
a communication path determined band acquiring unit for, for each of sections between communication devices adjacent to each other in the communication path, acquiring a section available band that is a communication band available in the section, and acquiring, as a communication path determined band, a smallest value between the acquired section available band and a communication path request band that is a communication band requested for the communication path;
a band reserving unit for reserving a communication band in the communication path by reserving the acquired communication path determined band in each of the sections configuring the communication path; and
a communication traffic controlling unit for transmitting communication traffic so that the communication traffic passes through the communication path where the communication band is reserved, the communication traffic satisfying a traffic flow condition including a condition that a transmission source communication device is the starting-point device and a transmission destination communication device is the end-point device.

2. The communication system according to claim 1, wherein the communication path determined band acquiring unit is configured so that:
a communication device configuring a most upstream section in a first direction in the communication path among the sections configuring the communication path acquires, as a section provisional band, a smallest value between the communication path request band and a section available band that is a communication band available in the section and notifies the acquired section provisional band as a section request band to a communication device configuring a downstream section in the first direction;
a communication device configuring a section other than the most upstream section in the first direction and a most downstream section in the first direction among the sections configuring the communication path acquires, as a section provisional band, smallest Value between the section request band notified from upstream in the first direction and a section available band that is a communication band available in the And notifies the acquired section provisional band as a section request band to a communication device configuring a downstream section in the first direction; and
a communication device configuring the most downstream section in the first direction among the sections configuring the communication path acquires the section request band notified from upstream in the first section, as the communication path determined band.

3. The communication system according to claim 2, wherein the band reserving unit is configured so that:
the communication device configuring the most downstream section in the first direction among the sections configuring the communication path notifies the acquired communication path determined band to a communication device configuring an upstream section in the first direction;
a communication device configuring a section Other than the most upstream section in the first direction and the most downstream section in the first direction among the sections configuring the communication path reserves, in the section, the communication path determined band notified from downstream in the first direction, and notifies the communication path determined band to a communication device configuring an upstream section in the first direction; and
the communication device configuring the Most upstream section in the first direction among the sections configuring the communication path reserves, in the section, the communication path determined band notified from downstream in the first direction.

4. The communication system according to claim 1, wherein the communication traffic controlling unit is configured to assign the communication path where the communication band is reserved to each of the traffic flow conditions, and transmit communication traffic satisfying the traffic flow condition so that the communication traffic passes through the communication path assigned to the traffic flow condition.

5. The communication system according to claim 4, wherein the communication path determined band acquiring unit is configured to accept a flow request band that is a communication band necessary for transmitting the communication traffic satisfying the traffic flow condition, and determine the communication path request band based on the accented flow request band.

6. The communication system according to claim 5, wherein a plurality of the communication paths are configured, the communication system being configured to:
execute a band reservation process on each of the communication paths in order, the band reservation process being to acquire the communication path determined band and reserve the acquired communication path determined band in the communication path; and
use a sum of the flow request bands for the traffic flow conditions that the communication paths are not assigned yet, as the communication path request band for the communication path that is a target of the band reservation process.

7. The communication system according to claim 6, wherein the communication device is configured to accept communication path information in which the communication path that the starting-point device is configured by the communication device is associated with the end-point device configuring the communication path, and execute the band reservation process on a communication path associated with a same end-point device as the transmission destination communication device provided in the traffic flow Condition in the accepted communication path information.

8. The communication system according to claim 7, wherein the communications path information is information in which the communication path is associated with a communication path priority representing a rank, the communication system being configured to execute, the band reservation process on the communication path in order of rank represented by the communication path priority associated with the communication path in the accepted communication path information.

9. The communication system according to claim 4, wherein the communication traffic controlling unit is configured to accept flow information in which the traffic flow condition is associated with a flow priority representing a rank, and assign the communication path to each of the traffic flow conditions in order of rank represented by the flow priority associated with the traffic flow condition in the accepted flow information.

10. A communication control method applied to a communication system including a plurality of communication devices, the communication system having a communication path configured by connecting a starting-point device, to an end-point device, so as to be capable of communicating via at least one relay-point, device, the starting-point device being one of the plurality of Communication devices, the end-point device being one of the communication devices other than the starting-point device among the plurality of communication devices, and the relay-point device being a communication device other than the starting-point device and the end-point device, among the plurality of communication devices, the communication control method comprising:
for each of sections between communication devices adjacent to each other in the communication path, acquiring a section available band that is a communication band available in the section, and acquiring, as a communication path determined band, a smallest value between the acquired section available band and a communication path request band that is a communication band requested for the communication path;
reserving a communication band in the communication path by reserving the acquired communication path determined band in each of the sections configuring the communication path; and
transmitting communication traffic so that the communication traffic passes through the communication path where the communication band is reserved, the communication traffic satisfying a traffic flow condition including a condition that a transmission source communication device is the starting-point device and a transmission destination communication device is the end-point device.

11. The communication system according to claim 1, being configured to, in a case where the section available band is changed after the communication band is reserved in the communication path, reacquire the communication path determined band based on the changed section available band, and reserve the acquired communication path determined band anew in the communication path.

12. The communication system according to claim 1, comprising a communication path additionally available band acquiring unit for, after the communication band is reserved in the communication path, acquiring a section additionally available band for each of the sections configuring the communication path, and acquiring a smallest value of the acquired section additionally available bands as a communication path additionally available band, the section additionally available band being a communication band available in the section other than the reserved communication band, wherein the band reserving unit is configured to reserve a communication band anew in the communication path based on the acquired communication path additionally available band.

13. The communication system according to claim 1, being configured to, in a case where one section configures a plurality of communication paths, communicate information on the plurality of communication paths in a state of being contained in one unit data having a predetermined format.

14. The communication control method according to claim 10, wherein:

a communication device configuring a most upstream section in a first direction in the communication path among the sections configuring the communication path acquires, as a section provisional band, a smallest value: between the communication path request band and a section available band that is a communication band available in the section, and notifies the acquired section provisional band as a section request band to a communication device configuring a downstream section in the first direction;

a communication device configuring a section other than the most upstream section in the first direction and a most downstream section in the first direction among the sections configuring the communication path acquires, as a section provisional hand, a smallest value between the section request band notified from upstream in the first direction and a section available band that is a communication band available in the section, and notifies the acquired section provisional band as a section request band to a communication device configuring a downstream Section in the first direction; and a communication device configuring the most downstream section in the first direction among the sections configuring the communication path acquires the section request band notified from upstream in the first section, as the communication path determined band.

15. The communication control method according to claim 14, wherein:

the communication device configuring the most downstream section in the first direction among the sections configuring the communication path notifies the acquired communication path determined band to a communication device configuring an upstream section in the first direction;

a communication device configuring a section other than the most upstream section in the first direction and the most downstream section in the first direction among the sections configuring the communication path reserves, in the section, the communication path determined band notified from downstream in the first direction, and notifies the communication path determined band to a communication device configuring an upstream section in the first direction; and the communication device configuring the most upstream section in the first direction among the sections configuring the communication path reserves, in the section, the communication path determined band notified from downstream in the first direction.

16. The communication system according to claim 2, Wherein the communication traffic controlling unit is configured to assign the communication path where the communication band is reserved to each of the traffic flow conditions, and transmit communication traffic satisfying the traffic flow condition so that the communication traffic passes through the communication path assigned to the traffic flow condition.

17. The communication system according to claim 3, wherein the communication traffic controlling unit is configured to assign the communication path where the communication band is reserved to each of the traffic flow conditions, and transmit communication traffic satisfying the traffic flow condition so that the communication traffic passes through the communication path assigned to the traffic flow condition.

18. The communication system according to claim 6, wherein the communication path information is information in which the communication path is associated with a communication path priority representing a rank, the communication system being configured to execute the band reservation process on the communication path in order of rank represented by the communication path priority associated with the communication path in the accepted communication path information.

19. The communication system according to claim 5, wherein the communication traffic controlling unit s configured to accept flow information in which the traffic flow condition in associated with a flow priority representing a rank, and assign the communication path to each of the traffic flow conditions in order of rank represented by the flow priority associated with the traffic flow condition in the accepted flow information.

20. The communication system according to claim 6, wherein the communication traffic controlling unit is configured to accept flow information in which the traffic flow Condition is associated with a flow priority representing a rank, and assign the communication path to each of the traffic flow conditions in order of rank represented by the flow priority associated with the traffic flow condition in the accepted: flow information.

* * * * *